United States Patent [19]

Vasalos

[11] 4,153,534
[45] May 8, 1979

[54] CATALYTIC CRACKING WITH REDUCED EMISSION OF NOXIOUS GASES

[75] Inventor: Iacovos A. Vasalos, Downers Grove, Ill.

[73] Assignee: Standard Oil Company (Indiana), Chicago, Ill.

[21] Appl. No.: 748,556

[22] Filed: Dec. 8, 1976

Related U.S. Application Data

[63] Continuation-in-part of Ser. No. 642,542, Dec. 19, 1975, abandoned.

[51] Int. Cl.$^2$ .................. C10G 11/02; B01D 15/06; B01J 29/06; C01B 17/00
[52] U.S. Cl. .................... 208/120; 208/164; 252/411 S; 252/417; 252/455 Z; 423/244
[58] Field of Search ............ 208/120; 252/417, 455 Z; 423/244

[56] References Cited

U.S. PATENT DOCUMENTS

| | | | |
|---|---|---|---|
| 931,515 | 8/1909 | Sprague | 423/244 |
| 2,248,994 | 7/1941 | Houdry | 423/244 |
| 3,364,136 | 1/1968 | Chen | 208/120 |
| 3,409,541 | 11/1968 | Flander et al. | 208/120 |
| 3,418,256 | 12/1968 | Risney et al. | 208/120 |
| 3,554,900 | 1/1971 | Bowes | 208/120 |
| 3,696,025 | 10/1972 | Chessmore | 208/120 |
| 3,699,037 | 10/1972 | Annesser et al. | 208/120 |
| 3,808,121 | 4/1974 | Wilson, Jr. | 208/120 |
| 3,832,445 | 8/1974 | Kouwenhoven et al. | 423/244 |
| 3,835,031 | 9/1974 | Bertolani et al. | 208/120 |
| 3,844,973 | 10/1974 | Stine et al. | 208/120 |
| 3,909,352 | 9/1975 | Horecky, Jr. et al. | 208/120 |
| 3,930,987 | 1/1976 | Grand | 208/120 |
| 3,957,623 | 3/1976 | McDaniel et al. | 208/120 |

*Primary Examiner*—O. R. Vertiz
*Assistant Examiner*—Gary P. Straub
*Attorney, Agent, or Firm*—Richard A. Kretchmer; Arthur G. Gilkes; William T. McClain

[57] ABSTRACT

A cyclic, fluidized catalytic cracking process providing reduced emissions of noxious effluents in regeneration zone flue gases is operated with homogeneous or non-homogeneous, regenerable, fluidized, solid particles which are circulated throughout the catalytic cracking process cycle and which comprise (1) a molecular sieve-type cracking catalyst, comprising a cracking catalyst matrix containing crystalline aluminosilicate distributed throughout said matrix and (2) a metallic reactant which reacts with sulfur oxides in the regeneration zone.

30 Claims, 2 Drawing Figures

4,153,534

CATALYTIC CRACKING WITH REDUCED EMISSION OF NOXIOUS GASES

CROSS-REFERENCE TO RELATED APPLICATIONS

This application is a continuation-in-part of application Ser. No. 642,542, filed Dec. 19, 1975, now abandoned.

BACKGROUND OF THE INVENTION

1. Field of the Invention

This invention is directed to a cyclic, fluidized catalytic cracking process which is suitable for use with sulfur-containing hydrocarbon feedstocks and which is characterized by a marked diminution in the emission of sulfur oxides in the regenerator stack gases.

2. Discussion of the Prior Art

Cracking catalyst which has become relatively inactive due to deposition of carbonaceous deposits, commonly called "coke," during the cracking of hydrocarbons in the reaction zone is continuously withdrawn from the reaction zone. Such spent catalyst from the reaction zone is passed to a stripping zone where strippable carbonaceous deposits, namely hydrocarbons, are stripped from the catalyst which in turn is passed to a regeneration zone where the activity of the catalyst is restored by removing the non-strippable carbonaceous deposits by burning the coke in oxygen-containing gas to form carbon monoxide and carbon dioxide. Hot regenerated catalyst is then continuously returned to the reactor to repeat the cycle.

In catalytic cracking, a problem arises from the incomplete combustion of carbon monoxide to carbon dioxide in the regeneration zone, leaving a significant amount of carbon monoxide in the regeneration zone flue gases. Aside from the undesirability of discharge of carbon monoxide to the atmosphere, carbon monoxide and residual oxygen in the regeneration zone flue gases tend to react and thereby cause burning in ducts and flues in the plant and damage to such structures by by excessive temperatures.

Further, when high-sulfur feedstocks, that is, petroleum hydrocarbon fractions containing organic sulfur compounds, are charged to a fluid-type catalytic cracking unit, the coke deposited on the catalyst contains sulfur. During regeneration of the coked, deactivated catalyst, the coke is burned from the catalyst surfaces; and, in this combustion process, the sulfur present is converted to sulfur dioxide, together with a minor proportion of sulfur trioxide, and thus included in the regeneration zone flue gas effluent stream. When cracking a high-sulfur feedstock, emissions of sulfur oxides are often in the range of about 1200 parts per million.

Pollution control standards have been developed for emission of carbon monoxide and for particulate matter and are expected to be considered soon for other emissions, such as the sulfur oxides, particularly sulfur dioxide. Consequently, much attention is being devoted to reducing the level of emissions of various combustion products and particulates from regeneration zone effluent streams associated with petroleum cracking units. It is necessary that the method selected for reducing such emissions be effective without lowering the activity and selectivity of the cracking catalyst. It is likewise necessary that the method selected not substitute one form of undesirable emission with another problem, for example, an increase in particulate emission or operating costs. In view of these considerations, a highly desirable approach to a reduction in the emission of sulfur oxides from petroleum cracking units lies in the use of a cracking catalyst which is modified to minimize emissions of sulfur oxides, while maintaining catalyst activity, stability, and resistance to attrition, under conventional cracking conditions in either existing or new cracking units.

Although metals are generally avoided in cracking catalysts and it is considered problematical to crack metal-containing stocks in the presence of a cracking catalyst, South African Pat. No. 7924/72 and its later issued counterpart, U.S. Pat. No. 3,909,392 (1975), to be discussed in greater detail hereinbelow, disclose the use in conjunction with cracking catalysts of combustion catalysts or promoters within the regeneration zone, which include a metallic bar, mesh network, or screen in the combustion zone; and fluidizable metal compounds, particularly powdered oxides of transition group metals—for example, ferric oxide, manganese dioxide, and rare earth oxides—which are added to the catalyst charge or confined within the regenerator vessel. Belgian Pat. No. 826,266 (1975) discloses a method very similar to that of U.S. Pat. No. 3,909,392 which involves a catalytic cracking catalyst in physical association with carbon monoxide-oxidation promoting catalyst of a metal having an atomic number of at least 20 and mentions metals from Groups IB, IIB, and III to VIII of the Periodic Chart—in particular platinum, palladium, rhodium, molybdenum, tungsten, copper, chromium, nickel, manganese, cobalt, vanadium, iron, cerium, ytterbium, and uranium—as useful oxidation promoters. Further, U.S. Pat. No. 3,808,121 discloses the regeneration of a cracking catalyst in the presence of a carbon monoxide oxidation catalyst which is retained in the regeneration zone.

Dutch patent application No. 7,412,423 discloses that a cracking catalyst containing less than 100 parts per million, calculated as metal, based on total catalyst, of at least one metal component selected from the group consisting of metals from Periods 5 and 6 of Group VIII of the Periodic Chart, rhenium, and compounds thereof, showed particularly spectacular reductions in the carbon monoxide content in flue gases from catalyst cracking catalysts. This patent also discloses a molecular sieve-type cracking which is prepared in the sodium form, ion-exchanged with ammonium ions, and then impregnated with rare earth metals.

Further, with regard to sulfur oxide emissions, although various methods for processing flue gas have been devised, for example, washing or scrubbing, chemical absorption, neutralization, and chemical reaction or conversion, all such methods for removal of sulfur oxides require extensive and expensive auxiliary equipment, thus increasing both operating and capital costs. An approach set forth in U.S. Pat. No. 3,699,037 contemplates the addition of at least a stoichiometric amount of a calcium or magnesium compound to the cracking cycle in relation to the amount of sulfur deposition on catalyst. This added material is intended to react with sulfur oxides and then, being in a finely subdivided condition, exit from the cracking cycle as particulate matter in the regeneration zone flue gas stream. Continued addition of such material obviously increases operating costs. Similarly, U.S. Pat. Nos. 3,030,300 (1962) and 3,030,314 (1962) disclose a catalytic cracking process which involves adding continuously to a moving bed cracking process cycle one or more compounds of boron, alkali metals and alkaline earth metals to thereby provide catalyst particles which have increased resistance against impact breakage and surface abrasion and which comprise a siliceous catalyst particle having a microporous, catalytically active core which is provided with an adherent, protective coating of a glaze comprised of silica and one or more compounds of boron, alkali metals and alkaline earth metals.

U.S. Pat. No. 3,835,031 (1974) discloses a cyclic, fluidized catalytic cracking process which provides reduced emissions of sulfur oxides in the regenerator stack gases. The method is operated with a catalyst which comprises a molecular sieve in a silica-alumina matrix and which is impregnated with one or more Group IIA metal oxides. U.S. Pat. Nos. 3,388,077 (1968); 3,409,390 (1968); and 3,849,343 (1974) disclose a method for effecting the conversion of a noxious waste gas stream containing carbon monoxide and sulfur oxides, which comprises contacting the stream with a catalytic composite of a porous refractory carrier material, a catalytically active metallic component, for example, a platinum group metal, and an alkaline earth component selected from the group consisting of calcium, barium, and strontium.

Thus far, no one has disclosed the method of this invention.

SUMMARY OF THE INVENTION

This invention is a cyclic, fluidized catalytic cracking process providing reduced emissions of sulfur oxides in regeneration zone flue gases. In several embodiments, this invention also provides substantially complete combustion of carbon monoxide in the regeneration zone and adsorption of the heat evolved during such combustion by solid particles which are circulated to the reaction zone and stripping zone before returning to the regeneration zone. Such solid particles comprise molecular sieve-type cracking catalyst and a metallic reactant and can also contain amorphous cracking catalyst and solids which are substantially inert to the cracking of hydrocarbons.

The metallic reactant can be incorporated into the molecular sieve-type cracking catalyst, amorphous cracking catalyst and substantially inert solid. Such incorporation can be achieved either before or after the particular substrate is introduced into the cracking process cycle. Conditions are employed in the cracking process cycle such that a stable metal- and sulfur-containing compound forms in the solid particles in the regeneration zone and a sulfur-containing gas is withdrawn from the stripping zone.

DETAILED DESCRIPTION OF THE INVENTION

Figure 2:
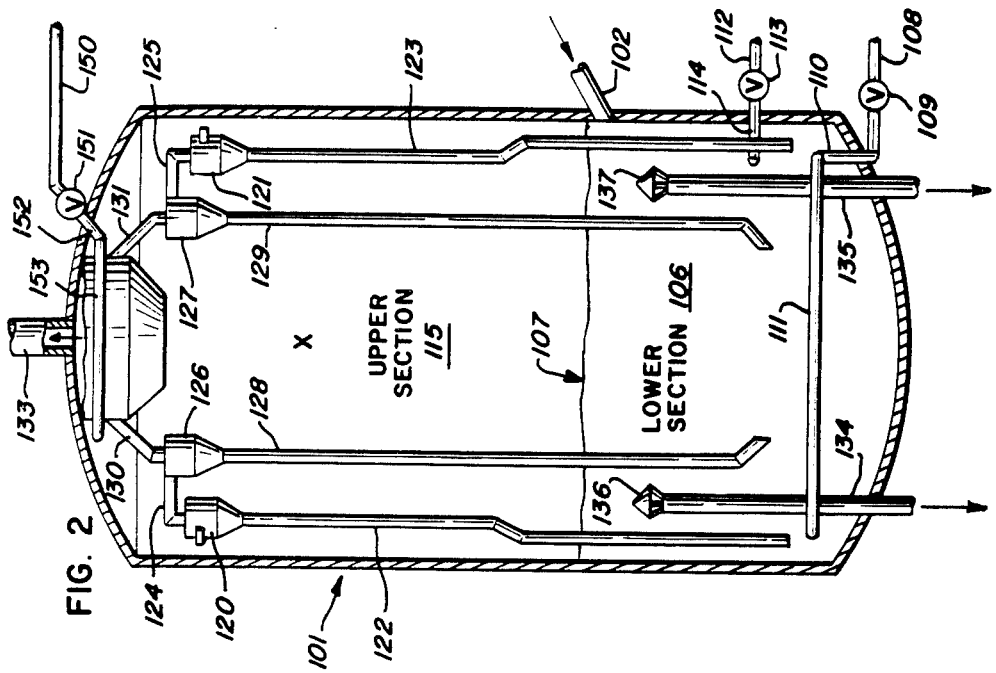

This invention is an improvement in a cyclic, fluidized catalytic cracking process wherein a hydrocarbon feedstock containing organic sulfur compounds is subjected to cracking in a reaction zone under fluidizing conditions with homogeneous or non-homogeneous, regenerable, fluidized, solid particles which comprise a molecular sieve-type cracking catalyst, wherein said cracking catalyst is concomitantly deactivated by sulfur-containing carbonaceous deposits. The fluidized solid particles are separated from cracked hydrocarbon reaction zone effluent and passed to a stripping zone wherein the deactivated cracking catalyst is stripped of strippable carbonaceous deposits by contact with a stripping gas. The fluidized solid particles are then separated from the gaseous stripping zone effluent and passed to a regeneration zone wherein the stripped, deactivated cracking catalyst is regenerated to high activity by burning the non-strippable, sulfur-containing carbonaceous deposits from the stripped, deactivated cracking catalyst in contact with an oxygen-containing gas stream, thereby forming carbon monoxide, carbon dioxide and sulfur oxides. The fluidized solid particles containing the regenerated cracking catalyst are separated from the regeneration zone effluent flue gases and recycled to the reaction zone.

The improvement comprises providing reduced emissions of sulfur oxides in regeneration zone flue gases by employing solid particles which comprise (1) a molecular sieve-type cracking catalyst comprising a cracking catalyst matrix containing crystalline aluminosilicate distributed throughout the matrix and (2) a metallic reactant which reacts with a sulfur oxide to form a metal- and sulfur-containing compound in said solid particles; by employing a stripping gas which contains steam; by regenerating the stripped, deactivated cracking catalyst at regeneration temperatures in the range where the metal- and sulfur-containing compound in the solid particles is stable; and by providing sufficient oxygen to the regeneration zone in the oxygen-containing regeneration gas stream that flue gases containing molecular oxygen are withdrawn from the regeneration zone.

A suitable hydrocarbon feedstock for use in the process may contain from about 0.2 to about 6 weight percent of sulfur in the form of organic sulfur compounds. Advantageously, the feedstock contains from about 0.5 to about 5 weight percent sulfur and more advantageously from about 1 to about 4 weight percent sulfur, wherein the sulfur is present in the form of organic sulfur compounds.

The cracking catalyst matrix of the molecular sieve-type cracking catalyst preferably is a combination of at least two materials selected from the group consisting of silica, alumina, thoria, and boria, and more preferably is silica-alumina. This cracking catalyst matrix contains preferably from about 10 to about 65, more preferably from about 25 to about 60 weight percent of alumina; preferably from about 35 to about 90, more preferably from about 35 to about 70 weight percent of silica; and preferably from about 0.5 to about 50, more preferably from about 5 to about 50 weight percent of crystalline aluminosilicate. The molecular sieve-type cracking catalyst makes up preferably from about 10 to about 99.999, more preferably from about 30 to about 99.995, and most preferably from about 90 to about 99.995 weight percent of the solid particles.

The metallic reactant consists of at least one free or combined metallic element which is selected from the group consisting of sodium, scandium, titanium, chromium, molybdenum, manganese, cobalt, nickel, antimony, copper, zinc, cadmium, the rare earth metals, and lead. Consequently, the metallic reactant may be selected from the group consisting of sodium, scandium, titanium, chromium, molybdenum, manganese, cobalt, nickel, antimony, copper, zinc, cadmium, the rare earth metals, lead, their compounds, and mixtures thereof. More preferably, the metallic reactant consists of at least one free or combined metallic element which is selected from the group consisting of sodium, chromium, manganese, copper, zinc, and cadmium. Ideally, the metallic reactant consists of at least one free or combined metallic element which is selected from the group consisting of sodium, manganese, and copper.

The oxide or oxides of the metallic element or elements of the metallic reactant are believed to be primarily responsible for the absorption of sulfur oxides in the regeneration zone. Consequently, it is advantageous to introduce the metallic element or elements of the metallic reactant into the catalytic cracking process cycle in the form of the oxide or oxides. It is sufficient, however, for the practice of this process that one or more suitable metallic elements be selected for use as the metallic reactant and introduced into the process cycle. The metallic element or elements of the metallic reactant are activated for the absorption of sulfur oxides in the regeneration zone as a consequence of the process steps of this invention. The activation is believed to involve either a partial or substantially complete conversion of the metal of metals of the metallic reactant to the corresponding oxide or oxides. This activation is substantially unaffected by the precise manner in which such metallic element or elements may be chemically combined when initially introduced into the process cycle.

The metallic reactant is present in sufficient average amount in the regeneration zone to absorb a major portion of the sulfur oxides produced by the burning of sulfur-containing carbonaceous deposits therein. At least about 50%, and advantageously more than about 80% of the sulfur oxides produced by such burning are absorbed by the metallic reactant in the regeneration zone. As a result, the concentration of sulfur oxides in the regeneration zone effluent gas stream from this novel process can be maintained at less than about 600–1000 parts per million by volume (ppmv), advantageously at less than about 600 ppmv, and more advantageously at less than about 400 ppmv.

The amount of metallic reactant employed, calculated as the metal or metals, is in the range from about 50 parts per million to about 10 weight percent based on the total weight of the solid particles. When copper is present, it is at an average level, calculated as copper, preferably in the range of from about 10 parts per million to about 10 weight percent, more preferably in the range of from about 50 parts per million to about 0.1 weight percent, and most preferably in the range of from about 50 parts per million to about 250 parts per million of the solid particles. When a metal selected from the group consisting of zinc, cadmium, manganese, scandium, and cobalt is present, it is at an average level, calculated as the metal, preferably in the range of from about 25 parts per million to about 7 weight percent, more preferably in the range of from about 0.01 weight percent to about 5 weight percent, and most preferably in the range of from about 0.01 weight percent to about 0.5 weight percent of the solid particles. When chromium, lead, or antimony is present, it is at an average level, calculated as said metal, preferably in the range of from about 10 parts per million to about 1 weight percent, more preferably in the range of from about 0.01 weight percent to about 0.1 weight percent, and most preferably in the range of from about 0.01 weight percent to about 250 parts per million, of the solid particles. When sodium is present, it is at an average level, calculated as sodium, preferably in the range of from about 0.6 weight percent to about 3 weight percent, more preferably in the range of from about 0.8 weight percent to about 2 weight percent, and most preferably in the range of from about 0.85 weight percent to about 1.5 weight percent of the solid particles.

When titanium is present, it is at an average level, calculated as titanium, preferably in the range of from about 10 parts per million to about 10 weight percent, more preferably in the range of from about 0.5 weight percent to about 1 weight percent, and most preferably in the range of from about 0.5 weight percent to about 0.8 weight percent, of the solid particles. When a rare earth metal is present, it is at an average level, calculated as the metal, preferably in the range of from about 0.2 weight percent to about 10 weight percent, more preferably in the range of from about 2 weight percent to about 6 weight percent, and most preferably in the range of from about 2 weight percent to about 4 weight percent of the solid particles. When nickel is present, it is present at an average level, calculated as nickel, preferably in the range of from about 10 parts per million to about 10 weight percent, more preferably in the range of from about 50 parts per million to about 0.5 weight percent, and most preferably in the range of from about 50 parts per million to about 0.1 weight percent of the solid particles.

Certain individual solids in the solid particles of the method of this invention can contain an amount of the metallic reactant which is greater than the average amount thereof in the solid particles, provided that such certain individual solids are admixed with other individual solids in the solid particles containing a smaller amount of the metallic reactant such that the solid particles contain the above-mentioned average levels of the metallic reactant.

The stripped, deactivated catalyst is regenerated at regeneration temperatures in the range where a stable metal- and sulfur-containing compound is formed in the solid particles from the metal in the metallic reactant and sulfur oxide. The regeneration temperatures are preferably in the range of from about 1,050° F. to about 1,450° F. and more preferably in the range of from about 1,180° F. to about 1,350° F. The hydrocarbon feedstock is cracked at reaction temperatures in the range where the metal- and sulfur-containing compound in the solid particles reacts to form a sulfide of the metal in the metallic reactant. The cracking reaction temperature is preferably in the range of from about 850° F. to about 1,200° F., and more preferably in the range of from about 870° F. to about 1,200° F. The strippable deposits are stripped from the deactivated cracking catalyst with a steam-containing gas and at stripping temperatures in the range where the sulfide of the metal in the metallic reactant reacts with water to form hydrogen sulfide gas. The stripping temperatures are preferably in the range of from about 850° F. to about 1,050° F., and more preferably in the range of from about 870° F. to about 1,000° F. The weight ratio of steam-to-molecular sieve-type cracking catalyst being supplied to the stripping zone is preferably in the range of from about 0.0005 to about 0.025, and more preferably in the range of from about 0.0015 to about 0.0125. The regeneration zone flue gases contain preferably at least 0.01 volume percent and more preferably at least 0.5 volume percent of molecular oxygen in order for the desired reduction of emissions of noxious gas to be achieved.

In one embodiment of this invention, the metallic reactant is incorporated into the molecular sieve-type cracking catalyst. In such case, the metallic reactant is incorporated into either the crystalline aluminosilicate or the matrix in the molecular-sieve type cracking catalyst. In another embodiment of this invention, the solid particles comprise additionally at least one material selected from the group consisting of solids which are substantially inert to the cracking of hydrocarbon feedstock and an amorphous cracking catalyst; and the metallic reactant is incorporated into such material. In still another embodiment of this invention, the metallic reactant is itself a solid in the solid particles.

The metallic reactant can be incorporated into the solid particles either outside or within the catalytic cracking process cycle, which comprises the cracking reaction zone, the stripping zone, and the regeneration zone. If incorporated during the catalytic cracking process cycle, then the metallic reactant can be introduced into the fluid catalytic cracking process cycle as an oil- or water-soluble or dispersable metal compound of the metal or metals in the metallic reactant, in the form of a solid, liquid, or gas and can be incorporated in situ into the solid particles. Preferably such compound is selected from the group consisting of metal diketonates, metal carbonyls, metallocenes, metal olefin complexes of from 2 to 20 carbon atoms, metal acetylene complexes, metal complexes of alkyl or aryl phosphines and metal carboxylates having from 1 to 20 carbon atoms.

This invention relates to an improved fluid catalytic cracking process, including an improved process for the regeneration of cracking catalyst employed in fluid catalytic conversion and an improved process for reducing emissions of sulfur oxides in cracking catalyst regeneration zone effluent gas, involving the conversion of sulfur-containing hydrocarbon feedstocks wherein the cracking catalyst is deactivated by the deposition of sulfur-containing coke on the cracking catalyst surface. The solid particles of the method of this invention, comprising molecular sieve-type cracking catalyst, are circulated in well-dispersed physical association with one another throughout the cracking process cycle, which comprises the cracking zone, the stripping zone, and the regeneration zone. The conditions employed effect reduction of sulfur oxides in the regeneration zone flue gas.

The cracking catalyst and metallic reactant of the method of this invention serve separate and essential functions. The cracking catalyst serves to catalyze the cracking reaction, while the metallic reactant is substantially inert toward the cracking reaction and has little, if any, adverse effect on the catalytic conversion operation under the conditions employed. With regard to the reduction of sulfur oxides in the regeneration zone flue gas, the solid particles adsorb sulfur oxides in the regeneration zone. The molecular sieve-type cracking catalyst itself often serves as an adsorbent for sulfur oxides. The metallic reactant reacts with the adsorbed sulfur oxides to form a metal- and sulfur-containing compound, in particular, a metal sulfate, in the solid particles. Provided that such metal- and sulfur-containing compound is stable under the operating conditions in the regeneration zone, it would be carried on the surfaces of the solid particles to the reaction zone and stripping zone where it would be reduced and separated as a sulfur-containing gas, in particular, as hydrogen sulfide.

It is understood that the activity in reducing the emission of sulfur oxides in the regeneration zone flue gases may vary from metal to metal in the class of those which may serve as a metal in the metallic reactant. Similarly, many of the specific metals which may serve as a metal in the metallic reactant do not necessarily yield equivalent results when compared with other specific metals which may be used in the metallic reactant or when utilized under varying conditions.

The solid particles of the method of this invention are finely divided and have, for example, an average particle size in the range of from about 20 microns or less to about 150 microns, such that they are in a form suitable for fluidization. Suitable cracking catalyst matrices include those containing silica and/or alumina. Other refractory metal oxides may be employed, limited only by their ability to be effectively regenerated under the selected conditions. Admixtures of clay-extend aluminas may also be employed. Preferred catalysts include combinations of silica and alumina, admixed with "molecular sieves", also known as zeolites or crystalline aluminosilicates. Suitable cracking catalysts contain a sufficient amount of crystalline aluminosilicates to materially increase the cracking activity of the catalyst, limited only by their ability to be effectively regenerated under the selected conditions. The crystalline aluminosilicates usually have silica-to-alumina mole ratios of at least about 2:1, for instance about 2 to 12:1, preferably from about 4 to about 6:1. Cracking catalysts with silica bases having a major proportion of silica, for example, from about 35 to about 90 weight percent silica and from about 10 to about 65 weight percent alumina are suitable. Such catalysts may be prepared by any suitable method, such as milling, co-jelling, and the like, subject only to provision of the finished catalyst in a physical form capable of fluidization.

Suitable "molecular sieves" include both naturally occurring and synthetic aluminosilicate materials such as faujasite, chabazite, X-type and Y-type aluminosilicate materials, and ultrastable, large-pore crystalline aluminosilicate materials. When admixed with, for example, silica-alumina to provide a petroleum cracking catalyst, the molecular sieve content of the fresh finished catalyst particles is suitably within the range of from about 0.5 to about 50 weight percent, desirably from about 5 to about 50. An equilibrium "molecular sieve" cracking catalyst may contain as little as about 1 weight percent crystalline material. The crystalline aluminosilicates are usually available or made in sodium form; the sodium component is then usually reduced to as small an amount as possible, generally less than about 0.30 weight percent, through ion exchange with hydrogen ions, hydrogen-precursors such as ammonium ions, or polyvalent metal ions, including calcium, strontium, barium, and the rare earths, such as cerium, lanthanium, neodyminium, and naturally-occurring rare earths and their mixtures. The usable crystalline materials are able to maintain their pore structure under the high temperature conditions of catalyst manufacture, hydrocarbon processing, and catalyst regeneration. The crystalline aluminosilicates often have a uniform pore structure of exceedingly small size, the cross-section diameter of the pores being in the size range of from about 6 to about 20 angstroms, preferably from about 10 to about 15 angstroms.

Catalytic cracking of heavy mineral oil fractions is one of the major refining operations employed in the conversion of crude oils to desirable fuel products such as high-octane gasoline fuels used in spark-ignited, internal combustion engines. Illustrative of "fluid" catalytic conversion processes is the fluid catalytic cracking process wherein high molecular hydrocarbon liquids or vapors are contacted with hot, finely-divided, solid catalyst particles, either in a fluidized bed reactor or in an elongated riser reactor, and the catalyst-hydrocarbon mixture is maintained at an elevated temperature in a fluidized or dispersed state for a period of time sufficient to effect the desired degree of cracking to lower molecular weight hydrocarbons typically present in motor gasoline and distillate fuels.

Suitable hydrocarbon feeds for the cracking process boil generally above the gasoline boiling range, for example, within the range of from about 400° F. to about 1,200+ F., and are usually cracked at temperatures ranging from about 850° F. to about 1,200° F. Such feeds include various mineral oil fractions boiling above the gasoline range such as light gas oils, heavy gas oils, wide-cut gas oils, vacuum gas oils, kerosenes, decanted oils, residual fractions, reduced crude oils and cycle oils derived from any of these as well as suitable fractions derived from shale oils, tar sands processing, synthetic oils, coal liquefaction and the like. Such fractions may be employed singly or in any desired combination.

The method of this invention can be employed in any conventional catalytic cracking scheme but is advantageously practiced in a fluid catalytic cracking system where at least a substantial portion of the hydrocarbon conversion is effected in a dilute-phase transfer line or riser reactor system utilizing very active catalysts employed at relatively high space velocities. Preferably, cracking occurs essentially exclusively in the riser reactor and a following dense catalyst bed is not employed for cracking. In a typical case where riser cracking is employed for conversion of a gas oil, the throughput ratio, or volume ratio of total feed to fresh feed, may vary from about 1 to 3. The conversion level may vary from about 40 to about 100 weight percent, and advantageously is maintained above about 60 weight percent, for example, between about 60 and 90 weight percent. By conversion is meant the percentage reduction by weight of hydrocarbons boiling above about 430° F. at atmospheric pressure by the formation of lighter materials or coke. The weight ratio of total cracking catalyst-to-oil in the riser reactor may vary within the range of from about 2 to about 20 in order that the fluidized dispersion will have a density within the range of from about 1 to about 20 pounds per cubic foot. Desirably, the catalyst-to-oil ratio is maintained within the range of from about 3 to about 20, preferably 3 to about 7. The fluidizing velocity in the riser reactor may range from about 10 to about 100 feet per second. The riser reactor generally has a ratio of length-to-average diameter of about 25. For producton of a typical naphtha product, the bottom section mixing temperature within the riser reactor is advantageously maintained at about 1,000° F. to about 1,100° F. for substantially complete vaporization of the oil feed, and so that the top section exit temperature will be about 950° F. For cracking resids and synthetic fuels, substantially higher temperatures would be necessary. Under these conditions, including provision for a rapid separation of spent catalyst from effluent oil vapor, a very short period of contact between the catalyst and oil will be established. Contact time within the riser reactor will generally be within the range of from about 1 to about 15 seconds, and preferably within the range of from about 3 to about 10 seconds. Short contact times are preferred because most of the hydrocarbon cracking occurs during the initial increment of contact time, and undesirable secondary reactions are avoided. This is especially important if higher product yield and selectivity, including lesser coke production, are to be realized.

Short contact time between catalyst particles and oil vapors may be achieved by various means. For example, catalysts may be injected at one or more points along the length of a lower, or bottom, section of the riser. Similarly, oil feed may be injected at all the points along the length of the lower section of the riser reactor, and a different injection point may be employed for fresh and recycle feed streams. The lower section of the riser reactor may, for this purpose, include up to about 80 percent of the total riser length in order to provide extremely short effective contact times inducive to optimum conversion of petroleum feeds. Where a dense catalyst bed is employed, provision may also be made for injection of catalyst particles and/or oil feed directly into the dense-bed zone.

While the conversion conditions set forth above are directed to the production of gasoline as fuel for spark-ignition internal combustion engines, the processing scheme may be suitably varied to permit maximum production of heavier hydrocarbon products such as jet fuel, diesel fuel, heating oil and chemicals, in particular, olefins and aromatics.

In the catalytic process, some non-volatile carbonaceous material, or "coke", is deposited on the catalyst particles. Coke comprises highly condensed aromatic hydrocarbons which generally contain a minor amount of hydrogen, say from about 4 to about 10 weight percent. When the hydrocarbon feedstock contains organic sulfur compounds, the coke also contains sulfur. As coke builds up on the catalyst, the activity of the catalyst for cracking and the selectivity of the catalyst for producing gasoline blending stocks diminishes. The catalyst particles may recover a major proportion of their original capabilities by removal of most of the coke therefrom in a suitable regeneration process.

The spent catalyst from the petroleum conversion reactor is stripped prior to entering the regenerator. The stripping vessel for use in a fluidized bed catalytic cracking unit may suitably be maintained essentially at conversion reactor temperature in the range of from about 850° to about 1,200° F. and desirably will be maintained above about 870° F. Preferred stripping gas is steam, although steam-containing nitrogen or other steam-containing inert or flue gas, may also be employed. The stripping gas is introduced at a pressure of generally at least about 10, preferably about 35 pounds per square inch gauge, suitable to effect substantially complete removal of volatile compounds from the spent conversion catalyst.

The method of this invention can be employed with any conventional cracking catalyst regeneration scheme but is advantageously employed with a regeneration system involving at least one dense-bed and at least one dilute-phase zone. Stripped spent catalyst particles may enter the dense-bed section of the regenerator vessel through suitable lines evolving from the stripping vessel. Entry may be from the bottom or from the side, desirably near the top of the dense-bed fluidized zone. Enter may also be from the top of the regenerator where catalyst has first been contacted with substantially spend regeneration gas in a restricted dilute-phase zone.

Catalyst regeneration is accomplished by burning the coke deposits from the catalyst surface with a molecular oxygen-containing gas, such as air. Many regeneration techniques are practiced commercially whereby a significant restoration of catalyst activity is achieved in response to the degree of coke removal. As coke is progressively removed from the catalyst, removal of the remaining coke becomes most difficult and, in practice, an intermediate level of restored catalyst activity is accepted as an economic compromise.

The burning of coke deposits from the catalyst requires a large volume of oxygen or air. Although the disclosed invention is not to be limited thereby, it is believed that these reactions can be summarized:

$$C + O_2 \rightarrow CO_2 \tag{a}$$

$$2C + O_2 \rightarrow 2CO \tag{b}$$

$$2C + O_2 \rightarrow 2CO_2 \tag{c}$$

Reactions (a) and (b) both occur under typical catalyst regeneration conditions wherein the catalyst temperature may range from about 1,050° to about 1,450° F. and are exemplary of gas-solid chemical interactions when regenerating catalyst at temperatures within this range. The effect of any increase in temperature is reflected in an increased rate of combustion of carbon and a more complete removal of carbon, or coke, from the catalyst particles. As the increased rate of combustion is accompanied by an increased evolution of heat, whenever sufficient free or molecular oxygen is present, the gas-phase reaction (c) may occur. This latter reaction is initiated and propagated by free radicals and can be catalyzed.

The burning of sulfur-containing coke deposits from the catalyst also resuls in the formation of sulfur oxides; and, although the disclosed invention is not to be limited thereby, this burning may be represented by the following chemical equations:

$$S \text{ (in coke)} + O_2 \rightarrow SO_2 \tag{d}$$

$$SO_2 + \tfrac{1}{2}O_2 \rightarrow SO_3 \tag{e}$$

Reactions (d) and (e) also occur under typical cracking catalyst regeneration conditions. While reaction (d) is fast, reaction (e) is relatively slow. Reaction (e) can be catalyzed by any catalyst which catalyzes reaction (c) above. Molecular sieves adsorb sulfur oxides, and therefore reaction (e) can occur on the cracking catalyst in the solid particles of the method of this invention. Other components of the solid particles can also adsorb sulfur oxides. The resulting sulfur trioxide can then react with a suitable metal, or more particularly an oxide of a metal in the metallic reactant, to form a stable metal sulfate in the solid particles. When the solid particles are separated from the regeneration zone flue gases, the metal sulfate in the solid particles is circulated to the reaction zone. Thus, the sulfur is rendered unavailble for exit as gaseous sulfur oxides in the regeneration zone flue gas.

The sulfate remains on the solid particles as they pass to the cracking reaction zone and, in the reducing atmosphere therein, is converted to the sulfide of a metal in the metallic reactant and possibly to hydrogen sulfide. Upon stripping with a steam-containing stripping gas in the stripping zone, the sulfur is converted to hydrogen sulfide and exits in the stripping zone effluent stream. The metallic reactant is thereby regenerated and made available again for reaction with sulfur oxides in the next pass through the regeneration zone. Hydrogen sulfide can then be recovered with the cracking products from the stripping zone, separated and converted to elemental sulfur in conventional facilities.

Although the disclosed invention is not to be limited thereby, it is believed that these reactions can be summarized:

Regenerator $M_xO + SO_2 + \tfrac{1}{2}O_2$ or
$M_xO + SO_3 \rightarrow M_xSO_4$ Reactor
$M_xSO_4 + 4H_2 \rightarrow M_xS + 4H_2O \rightarrow M_xO + H_2S + 3H_2O$ Stripper $M_xS + H_2O \rightarrow M_xO + H_2S$ where x is the ratio of the oxidation state of the oxide ion to the oxidation state of the metal in the metallic reactant when combined with oxygen.

These reactions are made possible through the use of both the molecular sieve-type cracking catalyst and metallic reactant of the method of this invention. The high cracking activity normally present in the molecular sieve catalyst remains substantially unaffected by the presence of the metallic reactant so that the anticipated conversion of feedstock and yield of cracked products are realized together with the dimunition of emission of sulfur oxides.

The metallic reactant can also be in a finely divided form, such as a powder, separate from the molecular sieve-type cracking catalyst or any other support. The metallic reactant may be a powder which is admixed with the hydrocarbon cracking catalyst and circulated through the catalytic cracking process cycle. Generally, such powdered metallic reactant is advantageous in that a powder is easy to charge to and handle in a fluidized catalytic cracking process system. The particle size of the powder should be selected so as to avoid segregation of the particles at the fluidizing velocities. Desirably, the particles in such powder are not so minute that problems occur such as excessive emission with the gases from the bed as entrained particulate matter; however, filters, cyclones, precipitators, and the like are usually employed in conjunction with fluidized catalytic cracking operations to recover most of the entrained particulate matter and return it to the system to abate losses. The powder should be sufficiently strong that excessive attrition and degradation of the sized powder may be avoided. Frequently, the average particle size of the powdered metallic reactant is from about 0.5 or 1 to 100 microns, preferably less than about 50 microns, in diameter. It has been noted that microsized particles, that is, having an average particle size of less than about 1 micron, for instance, about 0.01 to 0.5 micron, may tend to form aggregates of larger size which may benefically be employed in the process of this invention. Illustrative of powdered metallic reactants which may be employed in this invention are ferric oxide, ferrous oxide, manganese dioxide, cerium oxide and the like and Trimex, a product of Trimex Corp. and described in U.S. Pat. No. 3,630,696.

Alternatively, the metallic reactant can be incorporated onto a suitable support. Such support can be an amorphous cracking catalyst or a solid which is substantially inert to the cracking reaction and can, for example, be ceramic in nature. In such case, the supported metallic reactant is then admixed with the molecular sieve-type cracking catalyst. Desirably, the support used is porous and frequently has a surface area, including the area of the pores on the surface, of at least about 10, preferably at least about 50, square meters per gram.

Illustrative of the supports are silica, alumina, silica-alumina and the like. Alternatively, the metallic reactant can be incorporated into the molecular sieve-type cracking catalyst, or portion thereof, in the solid particles in the method of this invention. In such case, the metallic reactant can be introduced into the cracking catalyst during the catalyst manufacture or can be impregnated on the cracking catalyst structure. In such case, care should be taken in selection of the method of incorporation so that the cracking activity and selectivity of the cracking catalyst are not adversely affected. It is preferred that, if the cracking catalyst is of the type having ion-exchanged sites, the ion-exchange be completed prior to incorporation of the metallic reactant.

In any of the above cases, the precise manner in which the metal or metals of the metallic reactant is incorporated into the molecular sieve-type cracking catalyst, amorphous cracking catalyst, or substantially inert substrate is not known with absolute certainty. The metals may enter into a complex combination with the carrier material and other components of the solid particles of this invention. Therefore, it is understood that the use of the terms "metallic reactant" and "incorporated" into the substrate connotes the metals of such component existing within the carrier material in a combined form and/or in the elemental state.

The metallic reactant may be incorporated into a substrate by ion exchange, by impregnation, or by other means—by contacting the substrate or a component thereof with a solution or solutions of a compound or compounds of the metal or metals in the metallic reactant in an appropriate amount necessary to provide the desired concentration of the metallic reactant within the scope of the invention.

The metallic reactant may be combined with the substrate either in any step during preparation of the substrate or after the substrate has been prepared. One method manner of incorporation is to ion-exchange the substrate. For example, it is preferred to ion-exchange a crystalline aluminosilicate with a solution or solutions of a compound or compounds of the metal in the metallic reactant and then composite the ion-exchanged product with a porous cracking catalyst matrix. Also useful is the ion-exchanging of siliceous solids or clays with a solution or solutions of a compound or compounds of the metal or metals in the metallic reactant. Suitable compounds for this purpose include the metal halides, preferably chlorides, nitrates, amine halides, oxides, sulfates, phosphates and other water-soluble inorganic salts; and also the metal carboxylates of from 1 to 5 carbon atoms, and alcoholates.

Another method of preparing the metallic reactant for use in the present invention is by impregnation of a suitable support with a water or organic solvent-soluble or -dispersible compound of the metal or metals in the metallic reactant. The impregnation may be practiced in any way which will not destroy the structure of the substrate. The metallic reactant may be impregnated onto a support inert to the hydrocarbon cracking, the molecular sieve-type cracking catalyst, or an amorphous cracking catalyst.

Impregnation results in greater deposition and a primarily physical association on the surface of the substrate, while ion exchange results in a primarily chemical association and a greater diffusion and therefore less surface deposition. In impregnation, the metal is deposited and no significant ion exchange occurs between the metal and the substrate. In impregnating a substrate, the metal or metals in the metallic reactant can be present in or as a water-soluble or organic solvent-soluble salt or salts in solution in an amount or amounts sufficient to contain the quantity of metal or metals desired on the substrate, and the substrate is contacted therewith. The composite may be dried to remove the solvent, leaving the metallic reactant deposited on the substrate.

Preferably, waters-soluble nitrate salts are employed in the impregnating solution since residue from the thermal decomposition of nitrate salts is relatively innocuous to the activity of the hydrocarbon cracking catalyst. The halogen and sulfate salts of the metal to be impregnated may also be employed; however, since by-products from the thermal degradation of these salts may be deleterious to the activity of the hydrocarbon cracking catalyst, such salts are most often employed when depositing the metallic reactant on substrates which are substantially inert to the cracking reaction and which do not significantly adversely affect the hydrocarbon cracking reaction.

Another method of physically depositing the metallic reactant on a substrate, particularly porous substrates such as crystalline aluminosilicates, is adsorption of a fluid decomposable compound or compounds of the metal or metals in the metallic reactant on the substrate followed by thermal or chemical decomposition of the compound or compounds. The substrate may be activated by heating to remove any adsorbed water and then contacted with a fluid decomposable compound or compounds of the metal or metals in the metallic reactant thereby adsorbing the compound or compounds onto the substrate. Typical of such compounds are the metal carbonyls, metal alkyls, volatile metal halides and the like. The adsorbed compound or compounds may then be reduced thermally or chemically to its active state thus leaving uniformly dispersed on the substrate an active metallic reactant. Thermal reduction may be effected, for example, in the regeneration vessel during the regeneration process.

Both impregnation and adsorption can be performed with a substrate before it is introduced into the cracking process cycle. However, it is also advantageous to introduce a compound or compounds of the metal or metals in the metallic reactant into the cracking process cycle and incorporate it in situ into the substrate. Such compound or compounds can be introduced in either oil- or water-soluble or -dispersable form and in the solid, liquid, or gaseous state at any stage of the cracking process cycle so that wide distribution in the solid particles is achieved. For example, such compound or compounds can be admixed either with the feedstock or fluidizing gas in the reaction zone, with the regeneration gas, torch oil, or water in the regeneration zone, or with the stripping gas in the stripping zone, or can be introduced as a separate stream. Suitable compounds for in situ incorporation include metal salts, organometallic compounds, metal diketonates, carbonyls, metallocenes, olefin complexes of 2 to 20 carbons, acetylene complexes, alkyl or aryl phosphine complexes and carboxylates of 1 to 20 carbons. Specific examples of these are cyclopenatdienylsodium (I) dicarbonyl dimer, zinc dimethyl, and zinc diethyl.

The key features of activity and stability are more easily attainable by introducing the metallic reactant into the cracking process cycle and incorporating it into the solid particles in situ, rather than compositing it with the cracking catalyst during manufacture of the cracking catalyst. Introducing the metallic reactant into the cracking process cycle and incorporating it in situ as opposed to compositing it with the cracking catalyst during cracking catalyst preparation has been found to result in greater reduction in emissions of sulfur oxides in regeneration zone flue gases. Incorporating metallic reactant during the cracking cycle also is advantageous in that a larger degree of control is maintained over any potential deleterious effect of such metallic reactant on the cracking reaction as the rate and/or amount of such metallic reactant introduced into the cracking cycle can be varied. Also, such metallic reactant previously composited with the cracking cycle can be lost as fines during attrition of the cracking catalyst. Adding the metallic reactant to the cracking cycle and incorporating it into the solid particles in situ allows for maintenance of a desired amount of metallic reactant on the outside or accessible portions of the cracking catalyst.

Preferred embodiments of the method of this invention involve operation in conjunction with the regeneration scheme of U.S. Pat. No. 3,909,392. This patent, incorporated in its entirety by reference, is directed to an improved catalytic cracking process, including an improved process for the regeneration of catalysts employed in fluid catalytic conversion of hydrocarbon feedstocks wherein the catalyst is deactivated by the deposition of coke on the catalytic surfaces. The process enables the coke level on regenerated catalyst to be maintained at an extremely low level while simultaneously maintaining a favorable heat balance in the conversion unit and providing a flue gas stream having an extremely low carbon monoxide content. Heat from the combustion of carbon monoxide is absorbed by the regenerated catalyst and provides part of the process heat required in the hydrocarbon conversion zone. In one embodiment of the process of that patent, the combustion of carbon monoxide to carbon dioxide is carried substantially to completion within the regeneration vessel in a relatively dilute secondary catalyst regeneration zone advantageously at a temperature between about 1,200° and 1,500° F., desirably between about 1,250° and 1,450° F. The temperature of the secondary zone may be about 50° or 100° F. higher than that of the first regeneration zone. Partially regenerated catalyst from a relatively dense primary catalyst regeneration zone can be controllably flowed through the secondary zone in an amount and at a rate sufficient to absorb substantially all of the heat released by the combustion occurring in the secondary zone. Although most of the coke is burned from the catalyst in the primary zone, additional coke is burned from the partially regenerated catalyst while present in the secondary zone, and catalyst substantially free of coke may be recovered for recycle to the hydrocarbon conversion level.

In a second embodiment of the process of U.S. Pat. No. 3,909,392, substantially all of the combustion, including both the oxidation of coke or carbon on the catalyst and the oxidation of carbon monoxide, occurs within a single, relatively dense phase regeneration zone in response to the proper control of principally the regeneration temperature and gas velocity.

Similarly, when the process of the present invention is operated in embodiments involving the regeneration scheme of U.S. Pat. No. 3,909,392, the major amount of heat liberated from the combustion of carbon monoxide in the regeneration zone is absorbed by the solid particles of this invention which include the cracking catalyst and provides part of the heat required in the cracking zone. Beneficially, in such embodiments, the process of the present invention enables considerable coke and carbon monoxide to be combusted in the dense-phase zone, if one is present, wherein a substantially increased amount of solid particles is present, as compared to the dilute-phase zone, if one is present, to disperse the heat evolved therefrom. As the portion of combustion occurring in the dense-phase zone is increased, the evolution of heat in the dilute-phase zone is substantially reduced, hence, the need to provide rapid turnover of solid particles in the dilute-phase zone to absorb the evolved heat is reduced or eliminated.

In such embodiments, the process includes the use of the solid particles of this invention which comprise molecular sieve-type cracking catalyst and the metallic reactant of this method, in a system which supports substantially complete combustion of carbon monoxide. The low catalyst coke levels achieved are less than about 0.2 weight percent, preferably less than about 0.05 weight percent. This process can result in flue gas having carbon monoxide levels of less than about 0.2 volume percent, for example about 500 to 1000 parts per million, and as low as from about 0 to 500 parts per million. The process also includes provision for recovery of evolved heat by transfer directly to the solid particles within the regeneration vessel.

In such embodiments, the fluidizing gas in the dense zone of the regenerator may have a velocity, for example, in the range of from about 0.2 to 4 feet per second, desirably about 0.5 to 3 feet per second. The regeneration gas serving to fluidize the dense-bed contains free or molecular oxygen, and the oxygen is preferably charged to the regenerator in an amount somewhat in excess of that required for complete combustion of coke (carbon and hydrogen) to carbon dioxide and steam. The amount of oxygen in excess of that required for complete combustion of the coke may vary from about 0.1 to about 25 or more percent of the theoretical stoichiometric oxygen requirement for complete combustion of the coke, but advantageously need not be greater than about 10 percent. For example, when air is employed as the regeneration gas a 10 percent excess of air provides only about 2 volume percent oxygen in the effluent spent gas stream. Advantageously, the concentration of molecular or free oxygen and carbon monoxide at any point within the regenerator is maintained outside of the explosive range at those conditions, preferably the concentration of carbon monoxide is below the explosive range at those conditions, to eliminate any risk of detonation.

The regeneration gas, in addition to free or molecular oxygen, may contain inert, or diluent, gas such as nitrogen, steam, etc., recycle gas from the regenerator effluent, and the like. Frequently the oxygen concentration of the regeneration gas at the inlet to the regenerator is from about 2 to 30 volume percent, perferably about 5 to 25 volume percent. Since air is conveniently employed as a source of oxygen, a major portion of the inert gas may be nitrogen. The inert gas may serve to dissipate excessive heat from the combustion of coke from the catalyst. A source of hot, inert gas is the effluent from the regenerator, and a portion of this gas may be recycled to the regenerator and, for instance, combined with sufficient incoming air or other oxygen-containing gas, including essentially pure oxygen, to provide the desired oxygen content. Thus, the recycle gas may be employed in direct heat exchange to increase the temperature of the regeneration gas to provide even further heat economies in the system.

Solid particles within the dilute-phase may partially be carried into the separation zone, usually comprising cyclone separators in a plurality of stages, from which solid particles can be returned directly through dip-legs to the dense-bed zone, and spent regeneration and combustion gases are collected in a plenum and finally discharged for suitable recovery of heat energy contained therein. Recovery processes for heat from flue gas include steam generation, spent catalyst stripping, indirect heat exchange with various refinery streams such as feed to the particular conversion process, and employment in various drying or evaporation arrangements.

Figure 1:
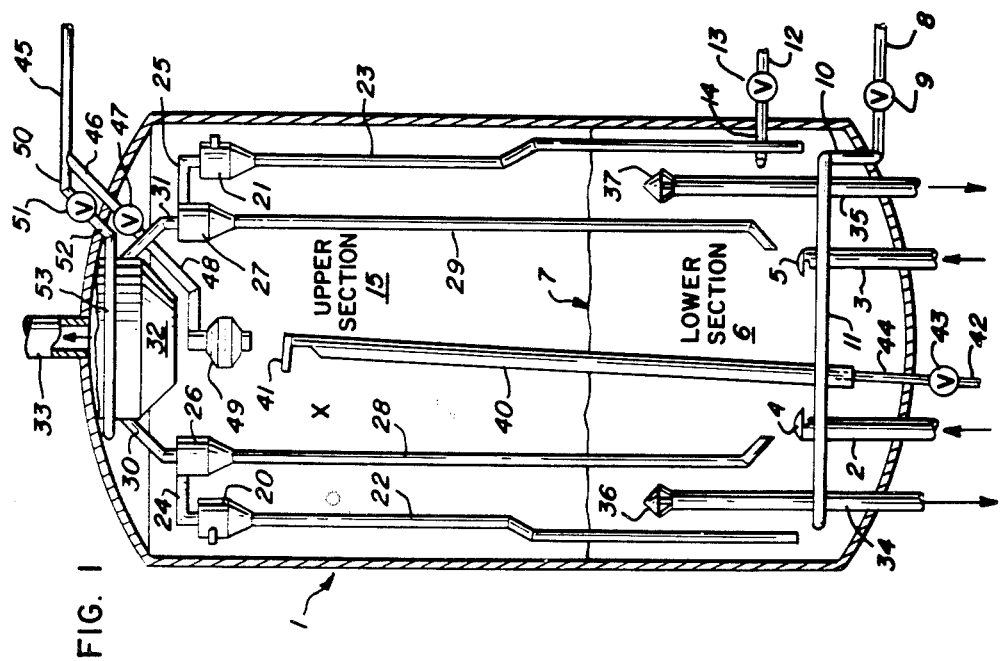

The attached drawings, FIGS. 1 and 2, provide elevational views, partly in section, of embodiments of apparatus suitable for catalyst regeneration according to embodiments of the process of this invention involving the regeneration scheme of U.S. Pat. No. 3,909,392. Indeed, such embodiments may be employed beneficially in many existing petroleum hydrocarbon cracking process units, particularly fluid catalytic cracking units having a variety of spatial arrangements of cracking, stripping and regeneration sections thereof.

FIG. 1 is illustrative of one such embodiment of this invention employing bottom entry of stripped, spent catalyst passing from the cracking reactor, not shown, to the regenerator. Solid particles containing spent catalyst impregnated with a metallic reactant from a stripping zone associated with the catalyst exit from the reactor, enter from the bottom of regeneration vessel 1. The solid particles flow upwardly through inlet lines 2 and 3 and discharge into the dense bed through discharge heads 4 and 5. The dense-phase bed is maintained within the lower section 6 of the regenerator vessel and extends upwardly to the phase interface 7. Solid particles within the dense-phase bed are fluidized by the flow of combustion air through line 8, valve 9 and line 10 to air ring 11. Substantially balanced air flow patterns through the regeneration zone may be achieved by the use of additional air rings, not shown, as required. Combustion of coke contained on the spent catalyst with air is initiated within the dense-phase bed. Higher temperatures may be achieved by temporarily burning a stream of torch oil, for example a decanted oil, within the bed. Torch oil may be added by passage through line 12, valve 13 and line 14 which terminates in a nozzle located above the air ring 11. Fluidizing air velocities continuously carry some of the solid particles upwardly into the dilute-phase zone which occupies the upper section 15 of the regenerator vessel; that is, the section above the phase interface 7. Combustion of coke continues in the dilute-phase zone and the largely spent combustion gas together with entrained solid particles is withdrawn into first-stage cyclone separators 20 and 21. Most of the solid particles are separated in the first-stage cyclones and discharged downwardly through dip-legs 22 and 23 into the dense-phase zone. Gases and remaining solid particles are passed through interstage cyclone lines 24 and 25 to second-stage cyclone separators 26 and 27 where substantially all of the remaining solid particles are separated and passed downwardly through dip-legs 28 and 29 into the dense-phase bed. Substantially spent combustion gas then passes through lines 30 and 31 into plenum 32 and finally is discharged from the regenerator vessel through line 33. This effluent may be suitably heat exchanged, not shown, with refinery stream or for production of process steam. Solid particles containing regenerated catalyst from the dense bed are withdrawn through standpipes 34 and 35, fitted with collector heads 36 and 37, for return to the cracking reactor.

Although the supply of combustion air normally provides an excess of oxygen over the amount required to effect complete combustion of the coke on the catalyst particles to steam and carbon dioxide, combustion of coke may not be completed in the dense-phase bed in one embodiment of this invention which employs the regeneration scheme of U.S. Pat. No. 3,909,392. In this situation, the combustion gases rising from the dense bed zone thus contain a substantial quantity of carbon monoxide as well as carbon dioxide and oxygen. The remaining coke on catalyst and the carbon monoxide are substantially completely burned in the dilute phase zone with evolution of much heat. When carbon monoxide burns in the dilute phase a high temperature zone will usually be present throughout much of the dilute phase zone and particularly at approximately the location indicated by X and can readily be viewed through a window, not shown, at that horizontal plane. Control of regeneration temperature within the dilute phase zone is effected in part through absorption of heat by the mass of solid particles either carried upwardly by the rising combustion gas stream or educted upwardly from the dense-bed through eductor tube 40 and solid distributor head 41 where a rain, or fountain, of solid particles disperses into the dilute phase zone. Solid particles can be educted by means of air, steam or other inert gas entering through line 42, valve 43 and jet tube 44 which extends a short distance into the lower end of eductor tube 40. Excessive temperature levels in the top section of the regenerator may be further controlled by distribution of steam, for example through lines 45 and 46, valve 47 and line 48 to steam pod 49. Temperatures in the vicinity of the plenum may also be controlled with steam fed through line 50, valve 51 and line 52 to steam ring 53 which surrounds plenum 32. Additional cooling if desired may be provided by use of a water spray, not shown, which may advantageously be directed within the region of interstage cyclone lines 24 and 25. Such lower temperatures favor the formation of stable metal- and sulfur-containing compounds in the regeneration zone.

FIG. 2 is illustrative of another embodiment of this invention employing the regeneration scheme to U.S. Pat. No. 3,909,392, with side entry of the solid particles containing stripped, spent catalyst and metallic reactant, from the cracking reactor to the regenerator. Solid particles containing spent catalyst impregnated with the metallic reactant, enter regeneration vessel 101 flowing downwardly through inlet line 102 located on the side of the regeneration vessel to provide entry into the dense-phase bed maintained within bottom section 106 a short distance below phase interface 107. Fluidization of the solid particles is effected by combustion air passing through line 108, valve 109 and line 110 to air ring 111. Additional air rings, not shown, may be employed as desired for further balancing of air flow patterns through the regeneration zones. As described in FIG. 1, combustion of coke on the spent catalyst particles is initiated within the dense-phase zone where higher temperatures as desired may be achieved by temporary burning of a torch oil stream within the zone. Such torch oil may be added through line 112, valve 113 and line 114, terminating in a nozzle.

Fluidizing air velocity may be controlled to continuously carry solid particles upwardly for purposes of heat absorption into the dilute-phase zone which occupies the upper section 115 of the regenerator vessel; that is, the section above the phase interface 107. Combustion of coke as well as of carbon monoxide may continue in the dilute-phase zone and the largely spent combustion gas together with the entrained portion of solid particles is withdrawn into first-stage cyclone separators 120 and 121. Most of these solid particles are separated in the first-stage cyclones and discharged downwardly through dip-legs 122 and 123 into the dense-phase zone. Gases and remaining solid particles subsequently pass through interstage cyclone lines 124 and 125 to second-stage cyclone separators 126 and 127 where substantially all of the remaining solid particles are separated and passed downwardly through dip-legs 128 and 129 into the dense-phase bed. Substantially spent combustion gas then passes through lines 130 and 131 into plenum 132 and finally is discharged from the regenerator vessel through line 133. Solid particles containing regenerated catalyst from the dense bed is withdrawn through standpipes 134 and 135, fitted with collector heads 136 and 137, for return to the catalytic cracking reactor.

As described for the embodiment of FIG. 1, carbon monoxide burns in the dilute-phase providing a high temperature zone throughout much of the dilute-phase zone and particularly at approximately the location indicated by X. Control of regeneration temperature within the dilute-phase zone is effected largely through absorption of heat by the mass of solid particles carried upwardly by the rising combustion gas stream. Temperatures in the vicinity of the plenum, cyclone and connecting lines may, as required, be reduced with steam fed through line 150, valve 151 and line 152 to steam ring 153 which surrounds plenum 132. Water spray means, not shown, may similarly be employed.

In another, particularly preferred embodiment of this invention, the apparatus shown in FIG. 2 is employed with a significant change in operating parameters as compared to the above described embodiment. In this embodiment, gas velocity and solid particles input are adjusted so that essentially complete combustion of coke and carbon monoxide is completed within the dense phase and the heat is dispersed throughout the bed.

When the system is operated according to either of the first two above-described embodiments, recovery of the heat released by the essentially complete combustion of coke and carbon monoxide is by absorption in solid particles in both phases, and return of the solid particles to the dense-phase serves also to secure maintenance of the suitably high temperature within the dense-phase zone. The returned solid particles may carry with them additional heat to serve to raise the temperature of the dense-phase zone to a temperature which favors the removal of additional increments of coke deposits thereon such that the combustion of the final increments of coke becomes substantially complete. When the system is operated so that essentially all combustion is completed within the dense catalyst phase, the heat is dispersed throughout the phase as it is absorbed by the fluidized solid particles and final increments of coke are combusted. Accordingly, in all embodiments, solid particles containing the regenerated catalyst passing from the regenerator back to the cracking reactor suitably contains from about 0.01 to about 0.10 weight percent, desirably 0.01 to 0.05 weight percent and preferably about 0.01 to about 0.03 weight percent of carbon or coke on catalyst, and can be withdrawn from the regenerator at an advantageous temperature for use in the cracking reactor.

An outstanding advantage of this invention lies in providing a regenerated catalyst generally possessing enhanced activity and selectivity characteristics more closely approaching those of fresh conversion catalyst, particularly for use in conversions effected at very short contact times in riser reactors. The cracking activity of sieve-containing catalysts and their selectivity for converting hydrocarbon feeds to desired products are both dramatically affected in a favorable direction by the increase elimination of residual carbon or coke on the catalyst during regeneration. The low coke level on the regenerated catalyst is especially preferred with fluid cracking catalysts containing catalytically active, crystalline aluminosilicates. Accordingly, higher yields of desirable conversion products may be achieved.

In those cracking processes using a lower dense phase zone and an upper dilute phase zone in the regeneration zone, the oxidation of the carbon monoxide to carbon dioxide may be accomplished to a major extent, often at least about 60 percent, and frequently about 65 to 95 percent or more, to completion in the dense phase of the regenerator. The oxidation of carbon monoxide to carbon dioxide in the dense phase provides heat to aid in sustaining the combustion of the coke deposits from the fluid catalyst. Furthermore, with a substantial portion of the carbon monoxide being oxidized in the dense phase, a lesser amount of carbon monoxide is present for combustion in the upper phase of the fluid catalyst in the regenerator, and thus "afterburning" and high temperatures due to uncontrolled excessive carbon monoxide combustion in the upper portion in the regenerator which may deleteriously affect materials employed to construct the reactor, waste gas flue, the collectors for any particulate materials in the waste gas, for example, cyclones, and which may impair catalyst activity, may be substantially reduced or avoided.

Solid particles containing the regenerated catalyst particles having unusually low residual coke contents are recovered from the dense-phase and passed at the substantially dense-bed temperature through a standpipe to the cracking reactor for contacting with fresh hydrocarbon feed or mixture thereof with recycle hydrocarbon fractions. Since the oxidation of the carbon monoxide evolved from the combustion of the coke deposits on the catalyst may occur to a major extent in the dense-phase and in the preferred embodiments essentially completely occurs in the dense phase, the regenerated catalyst can be returned to the cracking reactor at a much higher temperature as well as a higher activity than theretofore conventional operations.

A major benefit from the process of this invention relates to the unusually low carbon monoxide content in the effluent gas stream from the regenerator which may be obtained. Whereas flue gas from conventional regeneration of cracking catalysts usually contains from about 6 to 10 percent carbon monoxide, a similar amount of carbon dioxide and very little oxygen, the carbon monoxide content of the flue gas from this novel regeneration process may be maintained at less than about 0.2 volume percent, for example, about 500 to 1000 parts per million by volume (ppmv). Advantageously, the content is even lower, for example, within the range from 0 to about 500 ppmv. This low concentration of carbon monoxide in the flue-gas stream permits the direct release of effluent gases to the atmosphere while meeting ambient air quality standards. If required, any remaining carbon monoxide may suitably be burned in the exhaust from the regenerator flue gas stack. This advantage of the invention additionally permits the elimination of capital expenditures otherwise required for installation of carbon monoxide boilers and associated turbine-type devices or other means for partial recovery of energy produced by the subsequent oxidation of the carbon monoxide while still meeting the existing standards for ambient air quality for carbon monoxide emissions.

The method of this invention provides additional benefits. Such benefits relate to the problem of afterburning and heat balance. A major problem often encountered and sought to be avoided in the practice, particularly of fluid catalyst regeneration, is the phenomenon known as "afterburning", described, for example, in Hengstebeck, *Petroleum Processing*, McGraw-Hill Book Co., 1959, at pages 160 and 175 and discussed in *Oil and Gas Journal*, Volume 53 1 (No. 3), 1955, at pages 93–94. This term is descriptive of the further combustion of carbon monoxide to carbon dioxide, as represented by reaction (c) above, which is highly exothermic. Afterburning has been vigorously avoided in catalyst regeneration processes because it could lead to very high temperatures which may damage equipment and cause permanent deactivation of cracking catalyst particles. Many fluid catalyst regenerator operations have experienced afterburning, and a very substantial body of art has developed around numerous means for controlling regeneration techniques so as to avoid afterburning. More recently, it has been sought to raise regenerator temperatures for various reasons; elaborate arrangements have also been developed for control of regenerator temperatures at the point of incipient afterburning by suitable means for control of the oxygen supply to the regenerator vessel as set forth, for example, in U.S. Pat. Nos. 3,161,583 and 3,206,393, as well as in U.S. Pat. No. 3,513,087. In typical contemporary practice, accordingly, with avoidance of afterburning, the flue gas from catalyst regenerators usually contains very little oxygen and a substantial quantity of carbon monoxide and carbon dioxide in nearly equimolar amounts.

Further combustion of carbon monoxide to carbon dioxide is an attractive source of heat energy because reaction (c) is highly exothermic. Afterburning can proceed at temperatures above about 1100° F. and liberates approximately 4350 BTU per pound of carbon monoxide oxidized. This typically represents about one-fourth of the total heat evolution realizable of combustion of coke. The combustion of carbon monoxide can be performed controllably in a separate zone or carbon monoxide boiler, after separation of effluent gas from catalyst, as described in, for example, U.S. Pat. No. 2,753,925, with the released heat energy being employed in various refinery operations such as the generation of high pressure steam. Other uses of such heat energy have been described in U.S. Pat. Nos. 3,012,962 and 3,137,133 (turbine drive) and U.S. Pat. No. 3,363,993 (preheating of petroleum feedstock). Such heat recovery processes require separate and elaborate equipment but do serve to minimize the discharge of carbon monoxide into the atmosphere as a component of effluent gases, and hence, serve to avoid a potentially serious pollution hazard.

Moreover, silica-alumina catalysts, employed conventionally for many years in various processes for the cracking of petroleum hydrocarbons, are not particularly sensitive to the level of residual coke on catalyst provided that the coke level be no greater than about 0.5 weight percent. However, silica-alumina catalysts have largely been supplanted by catalysts additionally incorporating a crystalline aluminosilicate component and known as zeolites or "molecular sieves". The molecular sieve-containing catalysts are much more sensitive to the residual coke level, being greatly affected both with regard to catalyst activity and to catalyst selectivity for conversion of feed to the desired product or products. Due to the difficulties encountered in conventional catalyst regeneration techniques for removal of the last increments of residual carbon, the practical coke level usually corresponds to a residual coke content on regenerated catalyst within the range from about 0.2 to about 0.3 weight percent.

Since enhanced activity and selectivity are achievable with sieve-type cracking catalysts at low coke levels, an attractive incentive is provided for discovering a means for reducing residual coke levels still further. Coke levels below about 0.05 weight percent are greatly desired but usually cannot be achieved by commercially practicable means. Considerations such as larger regeneration vessels, greater catalyst inventory, greater heat losses, and the like, all serve to discourage attainment of such ideal equilibrium catalyst activity levels.

Many fluid cracking units are operated on the "heat balance" principal, depending upon combustion of coke for the evolution of heat required in the process. Such units, however, have not been able to fully utilize the benefits of the cracking catalysts, particularly zeolite catalysts, which can especially be achieved in a riser reactor where contact times between catalysts and oil vapors may be extremely short. The type of operation which affords high conversion coupled with the high selectivity, favors a low ratio of catalyst-to-oil in the riser reactor which leads to less coke being available to generate heat by combustion in the regenerator. Accordingly, an external heat source such as a feed preheat furnace, may frequently be added to increase the temperature of the catalyst or, alternatively, the unit may be operated at a lower temperature of fresh feed. Such undesirable features may be avoided or minimized by the process of this invention which permits efficient recovery of additional heat by the solid particles for transfer to the riser reactor. The heat of combustion of coke in conventional operations is about 12,000 BTU per pound. The process of this invention may increase available heat by combustion of the coke to about 17,000 or more BTU's per pound. This higher heat of combustion tends to raise the regenerator temperature, lower the level of coke on the regenerated catalyst, and lower the circulation rate of solid particles while providing improved yields at a given conversion level.

EXAMPLE 1

Two hundred grams of a calcined, equilibrium, commercially available, molecular sieve-type cracking catalyst containing 5.3 percent of hydrogen and rare earth ion-exchanged, Y-type crystalline aluminosilicate and silica-alumina, which contained 30 weight percent of alumina, were impregnated with 3.90 grams of a 50 weight percent manganese nitrate solution and 210 milliliters of water. About 80 weight percent of the catalyst was in the 20 to 75 micron range in size. The impregnated catalyst particles were recovered and dried at 250° F., followed by calcination for 3 hours at 1250° F. The resultant catalyst contained 0.3 weight percent of manganese.

EXAMPLE 2

The procedure of Example 1 was repeated, except that 2.35 grams of ceric ammonium nitrate dissolved in 200 milliliters of water was employed as the impregnating solution. The catalyst was dried and calcined as in Example 1 and contained 0.3 weight percent of cerium.

EXAMPLE 3

The procedure of Example 1 was repeated, except that 2.73 grams of zinc nitrate hexahydrate dissolved in 200 milliliters of water was employed as the impregnating solution. The catalyst was dried and calcined as in Example 1 and contained 0.3 weight percent of zinc. The same procedure was repeated except using ferric nitrate as the impregnant, and is hereinafter referred to as Example 3a.

EXAMPLE 4

One hundred milligrams of chloroplatinic acid was dissolved in 1 liter of water, and 18 milliliters of this solution was diluted with enough water to wet 300 grams of an equilibrium, commercially available cracking catalyst which had been withdrawn from a commercial unit and then calcined at 1000° F. for 5 hours and contained 2.5 weight percent of molecular sieve and 0.6 weight percent of sodium. The wetted catalyst was then dried at 250° F. for 3 hours and was calcined at 1000° F. for 3 hours. The catalyst contained 6 parts per million by weight of platinum.

EXAMPLE 5

The procedure of Example 1 was repeated, except that 1.1 grams of ammonium molybdate in a 210 milliliter aqueous solution was employed as the impregnating solution. The impregnated catalyst was dried at 250° F. for three hours, and then calcined at 1200° F. for three hours. The resultant catalyst contained 0.3 weight percent of molybdenum.

EXAMPLE 6

The procedure of Example 1 was repeated, except that 5.0 grams of titanium sulfate dissolved in 25 milliliters of an aqueous 30 percent solution of hydrogen peroxide which was diluted to 200 milliliters with water was employed as the impregnating solution. The solution was heated until the titanium salt was fully dissolved. The catalyst was dried at 250° F. and then calcined for 3 hours at 1200° F. The resultant catalyst contained 0.3 weight percent of titanium.

EXAMPLE 7

The procedure of Example 1 was repeated, except that 1.2 grams of chromic oxide dissolved in 200 milliliters of water was employed as the impregnating solution. The impregnated catalyst was dried for 3 hours at 250° F. and then calcined for 3 hours at 1200° F. The resultant catalyst contained 0.6 weight percent of chromium.

EXAMPLE 8

The procedure of Example 1 was repeated, except that 0.2506 gram of a 50 percent manganese nitrate solution and 200 milliliters of water was employed as the impregnating solution. The impregnated catalyst was dried at 250° F. for 3 hours and then calcined for 3 hours at 1200° F. The resultant catalyst contained 0.02 weight percent of manganese.

EXAMPLE 9

The procedure of Example 8 was repeated, except that 1.253 grams of a 50 percent solution of manganese nitrate in 210 milliliters of water was employed as the impregnating solution. The resultant catalyst contained 0.1 percent of manganese.

EXAMPLE 10

Ninety five grams of commercially available alumina was wetted with a solution of 3.22 grams of ammonium vanadate and 5 grams of oxalic acid in 95 milliliters of water, and was then dried at 250° F. for 3 hours and calcined at 1000° F. for 3 hours. This vanadium-impregnated alumina was next wetted with a solution of 9.3 grams of copper nitrate in 95 milliliters of water. This wetted alumina was dried at 250° F. for 3 hours and calcined at 1000° F. for 3 hours. The alumina contained 2.5 weight percent of vanadium and 2.5 weight percent of copper.

EXAMPLE 11

Ten grams of a solution of 6.9 grams of a lubricating oil additive which contained 9.2 weight percent of magnesium, distributed as magnesium hydroxide, magnesium carbonate, and magnesium polypropyl benzene sulfonate, dissolved in 33.1 grams of catalytic light cycle oil, was cracked in a bench scale cracking unit having a fluidized bed of 220 grams of an equilibrium, commercially available cracking catalyst which contained 2.5 weight percent of molecular sieve and about 0.6 weight percent of sodium and had been withdrawn from a commercial fluid catalytic cracking unit and then calcined. The cycle oil was cracked at 700° F. for 4 minutes. After purging the catalyst bed with nitrogen for 10 minutes at 1250° F., the catalyst bed was cooled to 700° F., and the cracking-purging-regeneration cycle was repeated until the magnesium, zinc, and phosphorus contents of the catalyst reached the level of 1100, 703, and 59 parts per million, respectively.

EXAMPLE 12

The procedure of Example 11 was repeated, except that the cracking-purging-regeneration cycle was repeated with a 10 g. solution containing 6.5 g. of the oil and 3.5 g. of a lube oil additive containing 1.6 wt.% Zn, 1.3 wt.% P, and 4.6 wt.% Mg until the magnesium, zinc, and phosphorus contents of the catalyst reached 2400, 1200, and 1097 parts per million, respectively.

EXAMPLE 13

The procedure of Example 12 was repeated, except that an equilibrium, commercially available cracking catalyst which contained 3.3 weight percent of molecular sieve in a silica-alumina matrix and had also been withdrawn from a commercial fluid catalytic cracking unit and calcined was employed and the cracking-purging-regeneration cycle was repeated until the magnesium, zinc, and phosphorus contents of the catalyst reached 4600, 304, and 1,136 parts per million, respectively.

EXAMPLES 14–18

A bench scale laboratory regeneration unit was used to test the potency of a number of the impregnated catalysts of Examples 1-13 for providing reduced emissions of carbon monoxide in regeneration zone flue gases. A synthetic flue gas composed of 4 volume percent of each of carbon monoxide, oxygen, and water vapor, and 88 volume percent of nitrogen was passed at a rate of about 1,000 milliliters (measured at 60° F.) through a fixed fluidized bed of the molecular sieve-type cracking catalyst impregnated with a metal, which was maintained in a glass regenerator surrounded by a furnace to provide the desired regeneration temperature of 1,200° F. The temperature of the catalyst was measured by thermocouples. A cyclone was used to separate entrained catalyst from the gas exiting from the regenerator and to return the catalyst to the catalyst bed. The time during which the regenerator was operated at a given set of conditions ranged from about 40 to about 90 minutes in order to allow sufficient time to establish the oxidation state of the metal on the catalyst in an actual fluid catalytic cracking unit operation.

The gas exiting from the regenerator was analyzed with a gas chromatograph for oxygen, nitrogen, carbon monoxide, and carbon dioxide. The amount of carbon monoxide converted was determined as the difference between the carbon monoxide contents of the fresh synthetic gas mixture and of the gas exiting from the regenerator.

In Examples 14-17, the impregnated catalysts produced in Examples 1, 2, 3, 3a were used, and the volume percent of carbon monoxide converted was 65, 72, 55, and 75, respectively. In Example 18, which employed the unimpregnated catalyst used in Examples 1, 2, 3 and 3a the volume percent of carbon monoxide converted was 31.

EXAMPLES 19-22

Several of the above catalysts were tested according to standard uniform test methods used in the industry in a microfluidized catalytic unit to determine the desired selectivity for catalytic cracking. As a basis, in Example 19, the unimpregnated cracking catalyst used in Example 1 had a relative micro-activity of 154, a coke factor of 1.0, and a hydrogen-to-methane mole percent ratio of 0.64. In Example 20, the impregnated catalyst produced in Example 1 was employed and showed a relative micro-activity of 147, a coke factor of 1.1, and a hydrogen-to-methane mole percent ratio of about 1.1-1.2. In Example 21, the impregnated catalyst produced in Example 2 was used and demonstrated a relative micro-activity of 150, a coke factor of 1.1, and a hydrogen-to-methane mole percent ratio of 0.9-1.1. In Example 22, the catalyst produced in Example 3a, was used and showed a relative activity of 134, a coke factor of 2.0, and a hydrogen-to-methane mole percent ratio of 6.5.

EXAMPLES 23-29

The procedure of Examples 14-18 was repeated, except that powdered metal oxides having a particle size of 5 microns and finer in admixture with the unimpregnated catalyst used in Example 1 were used in place of the impregnated catalysts. The powdered metal oxides, amounts thereof, and volume percent of carbon monoxide converted to carbon dioxide in Examples 23-26 as well as in comparative Example 27, which employed no metal oxide under otherwise identical conditions, are shown in Table 1. Similar data for Example 28 and its comparative Example 29, which employed no metal oxide under otherwise identical conditions, are also shown in Table 1.

TABLE 1

| Example | Metallic Oxide | Weight Percent of Metal Oxide in Catalyst | Volume Percent of Carbon Monoxide Converted |
|---|---|---|---|
| 23 | manganese dioxide | 1.0 | 46 |
| 24 | manganese dioxide | 2.0 | 51 |
| 25 | iron oxide | 0.3 | 34 |
| 26 | iron oxide | 1.0 | 35 |
| 27 | none | — | 28 |
| 28 | rare earth oxides | 1 | 65 |
| 29 | none | — | 33 |

EXAMPLES 30

The procedure of Examples 14-18 was repeated, except that a synthetic flue gas made up of 1500 parts per million of sulfur dioxide in a mixture of 4 volume percent of each of oxygen and steam in nitrogen at 1250° F. was passed through the regenerator at 1,500 milliliters per minute (measured at 60° F.) and an ultraviolet analyzer was used to measure continuously the sulfur dioxide content of the effluent gas. A test was run using an equilibrium, commercially available cracking catalyst which had been withdrawn from a commercial unit and then calcined at 1000° F. for 5 hours and contained 2.5 weight percent of molecular sieve and 0.6 weight percent of sodium. The volume percents of sulfur dioxide removed from the regeneration zone flue gas are shown as a function of elapsed time after beginning the experiment in Table 2. The volume percent removed decreased with time as the catalyst surface became saturated. In Example 30, the sulfur level in the form of soluble sulfate on the catalyst was 55 parts per million before the experiment and 368 parts per million afterward, corresponding to recovery on the catalyst of 76 weight percent of the sulfur removed from the regeneration gas.

TABLE 2

| Example Time | Volume Percent of Sulfur Dioxides Removed | | | | | | | |
|---|---|---|---|---|---|---|---|---|
| | 30 | 31 | 32 | 33 | 34 | 35 | 36 | 37 |
| 0-10 | 86-70 | 100 | 82 | 78-63 | 85-82 | 92-91 | 36-24 | 60-49 |
| 10-20 | 70-52 | 100 | 57 | 63-43 | 82-78 | 91-89 | 24-16 | 49-39 |
| 20-30 | 52-43 | 100 | 48 | 43-32 | 78-74 | 89-88 | 16-14 | 39-33 |
| 30-40 | 43-35 | 100 | 43 | 32-27 | 74-70 | 88-87 | 14-13 | 33-30 |

EXAMPLES 31-32

The procedure of Examples 30 was repeated in comparative tests using mixtures of a molecular sieve-type cracking catalyst and different amounts of the vanadium- and copper-impregnated alumina produced in Example 10. In Example 31, 10 grams of the vanadium- and copper-impregnated alumina were mixed with 90 grams of an equilibrium, commercially available cracking catalyst which contained 3.3 weight percent of molecular sieve and which had been withdrawn from a commercial fluid catalytic cracking unit and calcined at 1000° F. for 5 hours. The flow rate of the synthetic flue gas was 854 cubic centimeters/minute (measured at 60° F.).

In Example 32, 0.5 gram of the vanadium- and copper-impregnated alumina of Example 10 was mixed with 49.5 grams of the same calcined, equilibrium commercial cracking catalyst used in Example 31. The flow rate of the synthetic flue gas was 513 cubic centimeters/minute (measured at 60° F.). The volume percents of sulfur dioxide removed from the flue gas for Examples 31–32 are shown in Table 2.

EXAMPLES 33–37

The procedure of Examples 30 was repeated using a regeneration temperature of 1250° F. Example 33 was a comparative test using a flow rate of the synthetic flue gas mixture of 1084 milliliters per minute and the unimpregnated equilibrium catalyst used in Examples 11 and 12, while Examples 34 and 35 involved the impregnated catalyst produced in Examples 11 and 12, respectively, and flow rates for the synthetic flue gas mixture of 989 and 1,014 milliliters per minute, respectively. Example 36 was a comparative test using the unimpregnated catalyst used in Examples 13, 31 and 32 and a flow rate of the synthetic flue gas mixture of 891 milliliters per minute. Example 37 involved the impregnated catalyst produced in Example 13 and a flow rate of the synthetic flue gas mixture of 992 milliliters per minute. All flow rates were measured at 60° F. The volume percents of sulfur dioxide removed from the flue gas for Examples 33–37 are shown in Table 2.

EXAMPLES 38–39

In Example 38, a gas oil feed having a sulfur content of 1.67 weight percent was cracked in a commercial fluid catalytic cracking unit having a riser reactor. Conventional regeneration was employed. A commercial, equilibrium molecular sieve-type cracking catalyst containing 2.5 weight percent of molecular sieve and about 0.6 weight percent of sodium was used. In Example 39, a second gas oil feed having a sulfur content of 1.68 weight percent was cracked in the same commercial unit using the same regeneration scheme and the same cracking catalyst, but additionally the catalyst was impregnated with magnesium and zinc. The magnesium and zinc were deposited on the catalyst by introducing into the reaction zone small concentrations of magnesium sulfonate and zinc dialkyldithiophosphate in the form of lubricating oil additive in the feedstock. After several hours of addition in this manner, levels of magnesium of 0.3 weight percent and of zinc of 0.1 weight percent were built up on the cracking catalyst. The operating conditions and composition of the regeneration zone flue gases are shown in Table 3.

EXAMPLES 40–41

A gas oil feed having a sulfur content of 0.26 weight percent was cracked in a commercial fluid catalytic cracking unit having a riser reactor and employing conventional regeneration. In Example 41, a commercial, equilibrium, molecular sieve-type fluid cracking catalyst containing 2.5 weight percent of molecular sieve and 1.01 weight percent of sodium was used. The sodium was deposited on the catalyst by introducing with the feedstock an aqueous solution of sodium chloride. Comparative Example 40 involved cracking a gas oil having a sulfur content of 0.28 weight percent in the presence of the same catalyst used in Example 41, but not impregnated with sodium, under conditions which are otherwise substantially the same. The operating conditions and composition of the regeneration zone flue gases are shown in Table 3.

TABLE 3

| Example | 38 | 39 | 40 | 41 |
|---|---|---|---|---|
| Cracking conditions: | | | | |
| Cracking temperature, °F. | 974 | 970 | 920 | 925 |
| Total Feed rate, barrels/day | 49,200 | 46,800 | 23,150 | 24,970 |
| Throughput ratio | 1.07 | 1.25 | 1.12 | 1.11 |
| Catalyst circulation rate, tons/min. | 29.1 | 26.4 | 18 | 18 |
| Catalyst-to-oil weight ratio | 5.3 | 5.2 | 7.2 | 6.7 |
| Stripping conditions: | | | | |
| Stripping temperature, °F. | 970 | 965 | 915 | 875 |
| Steam lbs./ton catalyst | 8.6 | 9.4 | 9.2 | 11 |
| Regeneration conditions: | | | | |
| Dense bed temperature, °F. | 1270 | 1305 | 1195 | 1145 |
| Combustion air rate, lbs./hr. | 412,000 | 487,000 | 183,000 | 179,000 |
| Composition of regeneration zone effluent gas: | | | | |
| $CO_2$, mole percent | 13.0 | 14.0 | 11.8 | 11.0 |
| CO, mole percent | 5.0 | 5.6 | 7.3 | 5.2 |
| $O_2$ mole percent | 0.5 | 2.0 | 0.5 | 2.6 |
| Sulfur dioxide, ppmv | 580 | 60 | 184 | 34 |

I claim:
1. In a process for the cyclic, fluidized, catalytic cracking of hydrocarbon feedstock containing about 0.2 to about 6 weight percent sulfur as organic sulfur compounds wherein: (i) said feedstock is subjected to cracking in a reaction zone in contact with fluidized solid particles comprising cracking catalyst; (ii) solid particles including catalytic particles which are deactivated by sulfur-containing carbonaceous deposits, are separated from reaction zone effluent and pass to a stripping zone wherein volatile deposits are removed from said solid particles by contact with a stripping gas; (iii) stripped, solid particles are separated from stripping zone effluent and pass to a catalyst regeneration zone and non-stripped, sulfur-containing, carbonaceous deposits are removed from the stripped, solid particles by burning with an oxygen-containing gas thereby forming sulfur oxides; and (iv) resulting solid particles are separated from regeneration zone effluent gas and recycled to the reaction zone; a method for reducing emissions of sulfur oxides in the regeneration zone effluent gas which comprises:

(a) cracking said feedstock at a temperature from about 850° to about 1,200° F. in the presence of said solid particles comprising a molecular sieve-type cracking catalyst and at least one metallic reactant in the same or different ones of said solid particles, said metallic reactant consisting essentially of one or more members selected from the group consisting of sodium, scandium, titanium, chromium, molybdenum, manganese, cobalt, nickel, antimony, copper, zinc, cadmium, the rare earth metals and lead, in free or combined form, and wherein said metallic reactant is present in said solid particles in sufficient amount to effect the absorption of at least about 50 weight percent of the sulfur oxides produced by said burning of sulfur-containing carbonaceous deposits in the regeneration zone;

(b) stripping volatile deposits from said solid particles at a temperature from about 850° to about 1,200° F. with a stripping gas which contains steam, wherein the ratio by weight of steam to said molecular sieve-type cracking catalyst is from about 0.0005 to about 0.025, said stripping being conducted at a temperature and with steam such that passage of said solid particles through said cracking and stripping zones provides said metallic reactant in an amount and active form suitable for accomplishing said absorption of at least about 50 weight percent of the sulfur oxides produced by said burning in said regeneration zone;

(c) passing to the regeneration zone stripped, solid particles having said metallic reactant in an active form for absorbing at least about 50 weight percent of said sulfur oxides in said regeneration zone;

(d) burning in said regeneration zone said sulfur-containing carbonaceous deposits from the stripped, solid particles at a temperature from about 1,050° to about 1,450° F. said burning being conducted at a temperature and with oxygen containing gas having molecular oxygen such that at least about 50 weight percent of the sulfur oxides produced by said burning in said regeneration zone can be absorbed by said metallic reactant;

(e) absorbing with the solid particles at least about 50 weight percent of the sulfur oxides produced by said burning of sulfur-containing carbonaceous deposits in the regeneration zone;

(f) passing to the reaction zone said solid particles having absorbed therein at least about 50 weight percent of the sulfur oxides produced by said burning;

(g) withdrawing an effluent gas from the regeneration zone containing molecular oxygen and having a low concentration of sulfur oxides of less than about 600 ppmv; and (h) substantially converting said absorbed sulfur oxides to sulfur-containing gas in said reaction and/or stripping zone.

2. The process as set forth in claim 1 wherein said metallic reactant is present in sufficient amount to effect the absorption of at least about 80% of the sulfur oxides produced by said burning of sulfur-containing carbonaceous deposits in the regeneration zone, said burning being conducted at a temperature and with oxygen-containing gas having molecular oxygen such that at least about 80 weight percent of the sulfur oxides produced by said burning in said regeneration zone are absorbed by said solid particles by said absorbing, said stripping being conducted at a temperature and with steam such that passage of said solid particles through said cracking and stripping zones provides said metallic reactant in an amount and active form suitable for accomplishing said absorption of at least about 80 weight percent of the sulfur oxides produced by said burning in said regeneration zone, and said stripped, solid particles passing to the regeneration zone having said metallic reactant in an active form for absorbing at least about 80 weight percent of said sulfur oxides produced in said regeneration zone.

3. The process as set forth in claim 1 wherein the feedstock has a sulfur content in the range from about 0.5 to about 5 weight percent.

4. The process as set forth in claim 1 wherein said metallic reactant is selected from the group consisting of sodium, chromium, manganese, copper, zinc, rare earth metals and cadmium.

5. The process as set forth in claim 1 wherein said molecular sieve-type cracking catalyst comprises a crystalline aluminosilicate distributed throughout a matrix composed of silica and alumina.

6. The process as set forth in claim 1 wherein said solid particles are generated in situ by initiating the fluid catalytic cracking process cycle with solid particles of said molecular sieve-type cracking catalyst and subsequently introducing into the process cycle at least one oil- or water-soluble or -dispersible compound of the metal or metals of said metallic reactant.

7. The process as set forth in claim 6 wherein said compound is selected from the group consisting of metal diketonates, metal carbonyls, metallocenes, metal olefin complexes of 2 to 20 carbon atoms, metal acetylene complexes, metal complexes of alkyl or aryl phosphines, and metal carboxylates having from 1 to 20 carbon atoms.

8. The process as set forth in claim 1 wherein said catalyst particles are admixed with fluidizable particles of a supported metallic reactant in non-ion-exchanged form.

9. The process as set forth in claim 8 wherein said metallic reactant is present in sufficient amount to effect the absorption of at least about 80% of the sulfur oxides produced by said burning of sulfur-containing carbonaceous deposits in the regeneration zone, said burning being conducted at a temperature and with oxygen-containing gas having molecular oxygen such that at least about 80 weight percent of the sulfur oxides produced by said burning in said regeneration zone are absorbed by said solid particles by said absorbing, said stripping being conducted at a temperature and with steam such that passage of said solid particles through said cracking and stripping zones provides said metallic reactant in an amount and active form suitable for accomplishing said absorption of at least about 80 weight percent of the sulfur oxides produced by said burning in said regeneration zone, and said stripped, solid particles passing to the regeneration zone having said metallic reactant in an active form for absorbing at least about 80 weight percent of said sulfur oxides produced in said regeneration zone.

10. The process as recited in claim 1 wherein air and essentially pure oxygen are supplied to said regeneration zone as sources of oxygen for burning of said sulfur-containing carbonaceous deposits.

11. In a process for the cyclic, fluidized, catalytic cracking of hydrocarbon feedstock containing about 0.5 to about 5 weight percent sulfur as organic sulfur compounds wherein: (i) said feedstock is subjected to cracking in a reaction zone in contact with fluidized solid particles comprising cracking catalyst; (ii) solid particles including catalytic particles which are deactivated by sulfur-containing carbonaceous deposits, are separated from reaction zone effluent and pass to a stripping zone wherein volatile deposits are removed from said solid particles by contact with a stripping gas; (iii) stripped, solid particles are separated from stripping zone effluent and pass to a catalyst regeneration zone and non-stripped, sulfur-containing, carbonaceous deposits are removed from the stripped, solid particles by burning with an oxygen-containing gas thereby forming sulfur oxides; and (iv) resulting solid particles are separated from regeneration zone effluent gas and recycled to the reaction zone; a method for reducing emissions of sulfur oxides in the regeneration zone effluent gas which comprises:

(a) cracking said feedstock at a temperature from about 850° to about 1,200° F. in the presence of said solid particles comprising a molecular sieve-type cracking catalyst and at least one metallic reactant in the same or different ones of said solid particles, said metallic reactant consisting essentially of one or more members selected from the group consisting of sodium, chromium, manganese, copper, zinc, cadmium and the rare earth metals, in free or combined formed, and wherein said metallic reactant is provided to said cracking-stripping-regeneration process in non-ion-exchanged form with respect to said molecular sieve, and the amount of metal reactant present in said solid particles is sufficient to effect the absorption of at least about 50 weight percent of the sulfur oxides produced by said burning of sulfur-containing carbonaceous deposits in the regeneration zone;

(b) Stripping volatile deposits from said solid particles at a temperature from about 850° to about 1,200° F. with a stripping gas which contains steam, wherein the ratio by weight of steam to said molecular sieve-type cracking catalyst is from about 0.0005 to about 0.025, said stripping being conducted at a temperature and with steam such that passage of said solid particles through said cracking and stripping zones provides said metallic reactant in an amount and active form suitable for accomplishing said absorption of at least about 50 weight percent of the sulfur oxides produced by said burning in said regeneration zone;

(c) passing to the regeneration zone stripped, solid particles having said metallic reactant in an active form for absorbing at least about 50 weight percent of said sulfur oxides in said regeneration zone;

(d) burning in said regeneration zone said sulfur-containing carbonaceous deposits from the stripped, solid particles at a temperature from about 1,050° to about 1,450° F. said burning being conducted at a temperature and with oxygen-containing gas having molecular oxygen such that at least about 50 weight percent of the sulfur oxides produced by said burning in said regeneration zone can be absorbed by said metallic reactant;

(e) absorbing with the solid particles at least about 50 weight percent of the sulfur oxides produced by said burning of sulfur-containing carbonaceous deposits in the regeneration zone;

(f) passing to the reaction zone said solid particles having absorbed therein at least about 50 weight percent of the sulfur oxides produced by said burning;

(g) withdrawing an effluent gas from the regeneration zone containing molecular oxygen and having a low concentration of sulfur oxides of less than about 600 ppmv; and (h) substantially converting said absorbed sulfur oxides to sulfur-containing gas in said reaction and/or stripping zone.

12. The process as set forth in claim 11 wherein said metallic reactant is selected from the group consisting of sodium, manganese, rare earth metals and copper.

13. The process as set forth in claim 12 wherein said metallic reactant is sodium, and wherein the amount of sodium is from about 0.6 percent by weight to about 3 percent by weight based on the weight of the solid particles.

14. The process as set forth in claim 12 wherein the metallic reactant is manganese, and wherein the amount of manganese is from about 0.01 percent by weight to about 5 percent by weight based on the weight of the solid particles.

15. The process as set forth in claim 12 wherein the metallic reactant is copper, and wherein the amount of copper is from about 10 parts per million to about 10 percent by weight based on the weight of the solid particles.

16. The process as set forth in claim 11 wherein said molecular sieve-type cracking catalyst comprises about 0.5 to about 50 weight percent of a crystalline aluminosilicate distributed throughout a matrix composed of from about 10 to about 65 weight percent of alumina and from about 35 to about 90 weight percent of silica.

17. The process as set forth in claim 11 wherein the feedstock has a sulfur content in the range from about 1 to about 4 weight percent.

18. The process as set forth in claim 11 wherein said metallic reactant is present in sufficient amount to effect the absorption of at least about 80 percent of the sulfur oxides produced by said burning of sulfur-containing carbonaceous deposits in the regeneration zone, said burning being conducted at a temperature and with oxygen-containing gas having molecular oxygen such that at least about 80 weight percent of the sulfur oxides produced by said burning in said regeneration zone are absorbed by said particles by said absorbing, said stripping being conducted at a temperature and with steam such that passage of said solid particles through said cracking and stripping zones provides said metallic reactant in an amount and active form suitable for accomplishing said absorption of at least about 80 weight percent of the sulfur oxides produced by said burning in said regeneration zone, and said stripped, solid particles passing to the regeneration zone having said metallic reactant in an active form for absorbing at least about 80 weight percent of said sulfur oxides produced in said regeneration zone.

19. In a process for the cyclic, fluidized, catalytic cracking of hydrocarbon feedstock containing about 0.2 to about 6 weight percent sulfur as organic sulfur compounds wherein: (i) said feedstock is subjected to cracking in a reaction zone in contact with fluidized solid particles comprising cracking catalyst; (ii) solid particles including catalytic particles which are deactivated by sulfur-containing carbonaceous deposits, are separated from reaction zone effluent and pass to a stripping zone wherein volatile deposits are removed from said solid particles by contact with a stripping gas; (iii) stripped, solid particles are separated from stripping zne effluent and pass to a catalyst regeneration zone and non-stripped, sulfur-containing, carbonaceous deposits are removed frm the stripped, solid particles by burning with an oxygen-containing gas thereby forming sulfur oxides; and (iv) resulting solid particles are separated from regeneration zone effluent gas and recycled to the reaction zone; a method for reducing emissions of sulfur oxides in the regeneration zone effluent gas which comprises:

(a) cracking said feedstock at a temperature from about 850° to 1,200° F. in the presence of particles of a molecular sieve-type cracking catalyst in admixture with fluidizable particles other than said catalyst which contain at least one metallic reactant consisting essentially of one or more members selected from the group consisting of sodium, scandium, titanium, chromium, molybdenum, manganese, cobalt, nickel, antimony, copper, zinc, cadmium, the rare earth metals, and lead, in free or combined form, and wherein said metallic reactant is present in said particles other than said catalyst particles in sufficient amount to effect the absorption of at least about 50 weight percent of the sulfur oxides produced by said burning of sulfur-containing carbonaceous deposits in the regeneration zone;

(b) stripping volatile deposits from the mixture of particles at a temperature from about 850° to about 1,200° F. with a stripping gas which contains steam, wherein the ratio by weight of steam to said particles of molecular sieve-type cracking catalyst is from about 0.0005 to about 0.025, said stripping being conducted at a temperature and with steam such that passage of said particles through said cracking and stripping zones provides said metallic reactant in an amount and active form suitable for accomplishing said absorption of at least about 50 weight percent of the sulfur oxides produced by said burning in said regeneration zone;

(c) passing to the regeneration zone stripped, solid particles having said metallic reactant in an active form for absorbing at least about 50 weight percent of said sulfur oxides in said regeneration zone;

(d) burning in said regeneration zone said sulfur-containing carbonaceous deposits from the stripped particles at a temperature from about 1,050° to about 1,450° F., said burning being conducted at a temperature and with oxygen-containing gas having molecular oxygen such that at least about 50 weight percent of the sulfur oxides produced by said burning in said regeneration zone can be absorbed by said metallic reactant;

(e) absorbing with the admixture of particles at least about 50 weight percent of the sulfur oxides produced by said burning of sulfur-containing carbonaceous deposits in the regeneration zone;

(f) passing said admixture of particles having absorbed therein at least about 50 weight percent of the sulfur oxides produced by said burning from the regeneration zone to the reaction zone;

(g) withdrawing an effluent gas from the regeneration zone containing molecular oxygen and having a low concentration of sulfur oxides of less than about 600 ppmv; and (h) substantially converting said absorbed sulfur oxides to sulfur-containing gas in reaction and/or stripping zone.

20. The process as set forth in claim 19 wherein said metallic reactant is selected from the group consisting of sodium and rare earth metals.

21. The process as set forth in claim 20 wherein the feedstock has a sulfur content in the range from about 1 to about 4 weight percent.

22. The process as set forth in claim 19 wherein the support of said fluidizable particles which contain a metallic reactant is selected from a group consisting of amorphous cracking catalyst and substantially insert solids.

23. The process as set forth in claim 22 wherein said metallic reactant is selected from the group consisting of sodium, chromium, manganese, copper, zinc, rare earth metals and cadmium.

24. The process as set forth in claim 22 wherein said metallic reactant is selected from the group consisting of sodium, manganese rare earth metals, and copper.

25. The process as set forth in claim 19 wherein the regeneration zone effluent gas contains less than about 400 ppmv of sulfur oxides.

26. The process as set forth in claim 19 wherein said metallic reactant is present in sufficient amount to effect the absorption of at least about 80 percent of the sulfur oxides produced by said burning of sulfur-containing carbonaceous deposits in the regeneration zone, said burning being conducted at a temperature and with oxygen-containing gas having molecular oxygen such that at least 80 weight percent of the sulfur oxides produced by said burning in said regeneration zone are absorbed by said particles by said absorbing, said stripping being conducted at a temperature and with steam such that passage of said solid particles through said cracking and stripping zones provides said metallic reactant in an amount and active form suitable for accomplishing said absorption of at least about 80 weight percent of the sulfur oxides produced by said burning in said regeneration zone, and said stripped, solid particles passing to the regeneration zone having said metallic reactant in an active form for absorbing at least about 80 weight percent of said sulfur oxides produced in said regeneration zone.

27. The process as set forth in claim 19 wherein the feedstock has a sulfur content in the range from about 1 to about 4 weight percent.

28. In a process for the cyclic, fluidized, catalytic cracking of hydrocarbon feedstock containing about 0.2 to about 6 weight percent sulfur as organic sulfur compounds wherein: (i) said feedstock is subjected to cracking in a reaction zone in contact with fluidized solid particles comprising cracking catalyst; (ii) solid particles including catalytic particles which are deactivated by sulfur-containing carbonaceous deposits, are separated from reaction zone effluent and pass to a stripping zone wherein volatile deposits are removed from said solid particles by contact with a stripping gas; (iii) stripped, solid particles are separated from stripping zone effluent and pass to a catalyst regeneration zone and non-stripped, sulfur-containing, carbonaceous deposits are removed from the stripped, solid particles by burning with an oxygen-containing gas thereby forming sulfur oxides; and (iv) resulting solid particles are separated from regeneration zone effluent gas and recycled to the reaction zone; a method for reducing emissions of sulfur oxides in the regeneration zone effluent gas which comprises:

(a) cracking said feedstock at a temperature from about 850° to about 1,200° F. in the presence of said solid particles comprising a molecular sieve-type cracking catalyst and at least one reactant in the same or different ones of said solid particles, said metallic reactant consisting essentially of one or more rare earth metals, in free or combined form, and wherein said metallic reactant is present in said solid particles in sufficient amount to effect the absorption of at least about 50 weight percent of the sulfur oxides produced by said burning of sulfur-containing carbonaceous deposits in the regeneration zone;

(b) stripping volatile deposits from said solid particles at a temperature from about 850°0 to about 1,200° F. with a stripping gas which contains steam, wherein the ratio by weight of steam to said molecular sieve-type cracking catalyst is from about 0.0005 to about 0.025, said stripping being conducted at a temperature and with steam such that passage of said solid particles through said cracking and stripping zones provides said metallic reactant in an amount and active form suitable for accomplishing said absorption of at least about 50 weight percent of the sulfur oxides produced by said burning in said regeneration zone;

(c) passing to the regeneration zone stripped, solid particles having said metallic reactant in an active form for absorbing at least about 50 weight percent of said sulfur oxides in said regeneration zone;

(d) burning in said regeneration zone said sulfur-containing carbonaceous deposits from the stripped, solid particles at a temperature from about 1,050° to about 1,450° F., said burning being conducted at a temperature and with oxygen-containing gas having molecular oxygen such that at least about 50 weight percent of the sulfur oxides produced by said burning in said regeneration zone can be absorbed by said metallic reactant;

(e) absorbing with the solid particles at least about 50 weight percent of the sulfur oxides produced by said burning of sulfur containing carbonaceous deposits in the regeneration zone;

(f) passing to the reaction zone said solid particles having absorbed therein at least about 50 weight percent of the sulfur oxides produced by said burning;

(g) withdrawing an effluent gas from the regeneration zone containing molecular oxygen and having a low concentration of sulfur oxides of less than about 600 ppmv; and (h) substantially converting said absorbed sulfur oxides to sulfur-containing gas in said reaction and/or stripping zone.

29. The process as set forth in claim 28 in which the rare earth metal consists essentially of cerium.

30. In a process for the cyclic, fluidized, catalytic cracking of hydrocarbon feedstock containing about 0.2 to about 6 weight percent sulfur as organic sulfur compounds wherein: (i) said feedstock is subjected to cracking in a reaction zone in contact with fluidized solid particles comprising cracking catalyst; (ii) solid particles including catalytic particles which are deactivated by sulfur-containing carbonaceous deposits, are separated from reaction zone effluent and pass to a stripping zone wherein volatile deposits are removed from said solid particles by contact with a stripping gas; (iii) stripped, solid particles are separated from stripping zone effluent and pass to a catalyst regeneration zone and non-stripped, sulfur-containing, carbonaceous deposits are removed from the stripped, solid particles by burning with an oxygen-containing gas; and (iv) resulting solid particles are separated from regeneration zone effluent gas and recycled to the reaction zone; a method for reducing emissions of sulfur oxides in the regeneration zone effluent gas which comprises:

(a) cracking said feedstock at a temperature from about 850° to about 1,200° F. in the presence of said solid particles comprising a molecular sieve-type cracking catalyst and metallic reactant in the same or different ones of said solid particles, said metallic reactant consisting essentially of sodium and wherein said metallic reactant is present in said solid particles in sufficient amount to effect the absorption of at least about 50 weight percent of the sulfur oxides produced by said burning of sulfur-containing carbonaceous deposits in the regeneration zone;

(b) stripping volatile deposits from said solid particles at a temperature from about 850° to about 1,200° F. with a stripping gas which contains steam, wherein the ratio by weight of steam to said molecular sieve-type cracking catalyst is from about 0.0005 to about 0.025, said stripping being conducted at a temperature and with steam such that passage of said solid particles through said cracking and stripping zones provides said metallic reactant in an amoung and active form suitable for accomplishing said absorption of at least about 50 weight percent of the sulfur oxides produced by said burning in said regeneration zone;

(c) passing to the regeneration zone stripped, solid particles having said metallic reactant in an active form for absorbing at least about 50 weight percent of said sulfur oxides in said regeneration zone;

(d) burining in said regeneration zone said sulfur-containing carbonaceous deposits from the stripped, solid particles at a temperature from about 1,050° to about 1,450° F., said burning being conducted at a temperature and with oxygen-containing gas having molecular oxygen such that at least about 50 weight percent of the sulfur oxides produced by said burning in said regeneration zone can be absorbed by said metallic reactant;

(e) absorbing with the solid particles at least about 50 weight percent of the sulfur oxides produced by said burning of sulfur containing carbonaceous deposits in the regeneration zone;

(f) passing to the reaction zone said solid particles having absorbed therein at least about 50 weight percent of the sulfur oxides produced by said burning;

(g) withdrawing an effluent gas from the regeneration zone containing molecular oxygen and having a low concentration of sulfur oxides of less than about 600 ppmv; and (h) substantially converting said absorbed sulfur oxides to sulfur-containing gas in said reaction and/or stripping zone.

* * * * *

UNITED STATES PATENT OFFICE
CERTIFICATE OF CORRECTION

Patent No. 4,153,534          Dated   May 8, 1979

Inventor(s)          Iacovos A. Vasalos

It is certified that error appears in the above-identified patent and that said Letters Patent are hereby corrected as shown below:

Column 1, line 41, "by by" should read --by--.

Column 2, lines 44 and 45, "catalyst cracking" should read --catalytic cracking--.

Column 2, line 46, "cracking which" should read --cracking catalyst which--.

Column 5, line 18, "metal of metals" should read --metal or metals--.

Column 9, line 9, "1,200+ F." should read --1,200° F.--.

Column 11, line 56, "unavailble" should read --unavailable--.

Column 12, line 24, "dimunition" should read --diminution--.

Column 12, lines 55 and 56, cancel "ferric oxide, ferrous oxide".

Column 13, line 38, "method manner" should read --method--.

Column 14, line 8, "waters-soluble" should read --water-soluble--.

Column 14, line 61, "cyclopenatdienylsodium" should read --cyclopentadienyl-sodium--.

UNITED STATES PATENT OFFICE
CERTIFICATE OF CORRECTION

Patent No. 4,153,534   Dated May 8, 1979

Inventor(s) Iacovos A. Vasalos

It is certified that error appears in the above-identified patent and that said Letters Patent are hereby corrected as shown below:

Column 18, line 46, "to" should read --of--.

Column 20, line 13, "increase" should read --increased--.

Column 21, line 20, "53 1 (No. 3)" should read --53 (No. 3)--.

Column 22, line 30, "principal" should read --principle--.

Column 32, line 57, "frm" should read --from--.

Column 33, line 63, "insert" should read --inert--.

Column 34, line 3, "manganese rare" should read --manganese, rare--.

Column 34, line 66, "850°0" should read --850°--.

Column 36, line 24, "amoung" should read --amount--.

Signed and Sealed this

*Fifteenth* Day of *April 1980*

[SEAL]

*Attest:*

SIDNEY A. DIAMOND

*Attesting Officer*   *Commissioner of Patents and Trademarks*